United States Patent
Gai et al.

(10) Patent No.: US 12,081,657 B2
(45) Date of Patent: Sep. 3, 2024

(54) WATERMARKING OF GENOMIC SEQUENCING DATA

(71) Applicants: Children's Hospital Los Angeles, Los Angeles, CA (US); University of Southern California, Los Angeles, CA (US)

(72) Inventors: Xiaowu Gai, La Canada-Flintridge, CA (US); Alex Ryutov, Playa Vista, CA (US); Tatyana Ryutov, Playa Vista, CA (US)

(73) Assignees: Children's Hospital Los Angeles, Los Angeles, CA (US); University of Southern California, Los Angeles, CA (US)

( * ) Notice: Subject to any disclaimer, the term of this patent is extended or adjusted under 35 U.S.C. 154(b) by 169 days.

(21) Appl. No.: 17/638,705

(22) PCT Filed: Aug. 26, 2020

(86) PCT No.: PCT/US2020/047996
§ 371 (c)(1),
(2) Date: Feb. 25, 2022

(87) PCT Pub. No.: WO2021/041542
PCT Pub. Date: Mar. 4, 2021

(65) Prior Publication Data
US 2023/0048167 A1 Feb. 16, 2023

Related U.S. Application Data

(60) Provisional application No. 62/891,830, filed on Aug. 26, 2019.

(51) Int. Cl.
*H04L 9/08* (2006.01)
*H04L 9/06* (2006.01)

(52) U.S. Cl.
CPC .......... *H04L 9/0869* (2013.01); *H04L 9/0618* (2013.01); *H04L 2209/608* (2013.01)

(58) Field of Classification Search
CPC ................. H04L 9/0869; H04L 9/0618; H04L 2209/608; H04L 9/065; H04L 9/50;
(Continued)

(56) References Cited

U.S. PATENT DOCUMENTS

2009/0226056 A1 9/2009 Vlacos et al.
2009/0254971 A1 10/2009 Herz et al.
(Continued)

OTHER PUBLICATIONS

International Search Report, International Application No. PCT/US20/047996, dated Dec. 2, 2020, 2 pages.
(Continued)

*Primary Examiner* — Quazi Farooqui
(74) *Attorney, Agent, or Firm* — Klarquist Sparkman, LLP

(57) ABSTRACT

Examples are described for dynamically applying a digital watermark to a file, such as a dataset of genomic sequencing data. In one example, a method of dynamically applying a watermark to at least a portion of a file includes generating, using a secret key, a first random seed, generating, using the first random seed, an ordered pseudorandom set of integers, generating, using entity information and timing information, a second random seed, selecting, using the second random seed, a subset of the ordered pseudorandom set of integers, and modifying data at data locations in the file corresponding to at least a portion of the identifiers included in the subset to generate a watermarked file. The method may further include performing a check to determine whether the watermark is present in a file using a sequence of watermark elements that are generated based on the secret key.

20 Claims, 15 Drawing Sheets
Specification includes a Sequence Listing.

(58) Field of Classification Search
CPC . H04L 9/3239; H04L 9/3247; H04L 63/0428; H04L 9/08; G06F 21/64; G06F 2221/2137; G06F 21/16; G06F 21/6209; G06F 21/6245
See application file for complete search history.

(56) References Cited

U.S. PATENT DOCUMENTS

| | | |
|---|---|---|
| 2017/0329942 A1 | 11/2017 | Choi et al. |
| 2017/0329943 A1* | 11/2017 | Choi ....................... H04L 63/10 |
| 2019/0089372 A1 | 3/2019 | Roth et al. |
| 2019/0334884 A1* | 10/2019 | Ross ....................... G06F 21/41 |

OTHER PUBLICATIONS

Written Opinion, International Application No. PCT/US20047996, dated Dec. 2, 2020, 6 pages.
International Preliminary Report on Patentability for PCT/US2020/047996, Mar. 10, 2022, 7 pages.
Extended European Search Report for European Application No. 20857142.2, Aug. 8, 2023, 10 pages.

\* cited by examiner

GGTCTGATATCACCAGCATAACCGAGCGGGTAAGTTATTT

PERCENTAGE OF DISCOVERED WATERMARK BASES – RANDOM KEYS VS SECRET KEY

MERGED BAMS: PERCENTAGE OF DISCOVERED WATERMARK BASES – RANDOM KEYS VS SECRET KEY

SEQUENCE LISTING

<160> NUMBER OF SEQ ID NOS: 1

<210> SEQ ID NO 1
<211> LENGTH: 28
<212> TYPE: DNA
<213> ORGANISM: Artificial Sequence
<220> FEATURE:
<223> OTHER INFORMATION: Synthetic Sequence

<400> SEQUENCE: 1
ttacgctaca ggcttcactg tgacagca                                    28

WATERMARKING OF GENOMIC SEQUENCING DATA

CROSS REFERENCE TO RELATED APPLICATIONS

This application is the U.S. National Stage of International Application No. PCT/US2020/047996, filed Aug. 26, 2020, which was published in English under PCT Article 21(2), which in turn claims the benefit of U.S. Provisional Application No. 62/891,830, filed Aug. 26, 2019. The provisional application is incorporated herein in its entirety.

BACKGROUND

The advent of next-generation sequencing (NGS) technologies led to the emergence of genomic medicine, which uses the genomic information to understand disease mechanisms and to guide patient care, such as for diagnostic, prognostic and therapeutic decision-making. As part of it, huge amount of genomic sequencing data have been generated for both research and clinical purposes with drastic more such data anticipated in the future. Genomics has been compared with other major sources of Big Data including astronomy, and may be considered the most demanding in terms of all four major aspects of Big Data, namely, data acquisition, storage, distribution, and analysis with the astronomical, or rather genomical, growth of DNA sequencing in terms of the overall sequencing capacity but also the number of human genomes sequenced each year and cumulatively.

Biomedical research has benefited tremendously from the genomical growth of sequencing capacity. For example, cancer is considered a genetic disease. Using pediatric cancer as an example, pan-cancer analyses of pediatric tumors reveal a spectrum of nuclear somatic DNA alterations that vary by tumor type, and at least 8.5% of pediatric cancer patients have germline mutations in cancer predisposition genes. The patterns of these genomic alterations are distinctly different from one tumor type to another and one patient from another, which have been shown to be of diagnostic, prognostic and therapeutic importance and implications. For example, a comprehensive next-generation sequencing panel, OncoKids, was developed for pediatric cancers, which has demonstrated significant clinical utility in two years since its launch, with clinically significantly findings found in two thirds of 700 patients tested. Clinical exome sequencing tests, similarly, allowed for identification of pathogenic cancer predisposition variants in 8/106 (7.5%) patients tested. Such findings have all been enabled and empowered by the advent of massively parallel sequencing technologies, which led to 1 million fold decrease of the cost of sequencing a human genome since 2003, when the human genome project was completed. These genomic technologies have led to tremendously improved understanding of cancer etiology which, however, is only possible when the researchers and the patients are willing to share the genomic data. Again using research experience as an example the landscape of germline and somatic mitochondrial DNA mutations in pediatric cancers was able to be established from mining the matched tumor-normal whole genome sequencing data of 621 pediatric cancer patients, collected and shared by the St. Jude's Children's Hospital instead based on these patients informed consent.

With the success of the 1000 Genomes Project, the Cancer Genome Atlas program, the International Cancer Genome Consortium (ICGC), to name a few, and many large national and international population-scale genomics initiative such as the Genomics England, there has been little doubt about the benefits and the importance of sharing of genomic data. Along the way, there have been many associated challenges, however, including but not limited to technical challenges with standards, capabilities, and performance. For example, along with power and excitement, the tsunami of genomic data, also presents desperate needs for advanced informatics methodologies to facilitate genomic data sharing and to address the associated challenges, both technical and also from the legal and ethical points of view.

One such challenge relates to privacy concerns regarding access to and usage of the genomic data. The genomic sequencing data is deemed Personal Health Information (PHI) according to the Health Insurance Portability and Accountability Act (HIPAA) Privacy Rule, and also the General Data Protection Regulation recently established by the European Parliament and Council of the European Union. Since the genomic sequencing data could reveal the person's risks for various diseases, such as cancers and heart diseases, privacy concerns have been raised because of potential inappropriate use of the genomic sequencing data. While the Genetic Information and Nondiscrimination Act of 2008 (GINA) has made it illegal for health insurers or employers from discriminatory use of the genomic sequencing data, there is a lack of computational methodologies for an individual a) to protect his/her privacy risks while still benefiting from genomic medicine, b) to participate in genomic research which requires sharing genomic data for the general good of the society.

On the other hand, informed consent is now the essential component of any modern biomedical research involving human subjects. The notion of informed consent emerged after decades of atrocities, followed by tremendous efforts to address the problem that resulted in The Nuremberg Code, The Declaration of Helsinki, the Common Rule, and the Belmont Report. It is now a key component of any modern biomedical research involving human subjects. Information, comprehension and voluntariness are the three pillars that define informed consent in general as the full disclosure of the nature of the research and involvement of the participant, adequate comprehension for the participant, and the participant's voluntary choice to participate or not. The conventional paper-based and static consent for a study with clearly specified goals and end points, however, could not meet the complexity and challenges of the emerging genomic research, which typically requires combining data sets from multiple studies, performing analyses that are not specified by each study at the time of consent, and making unanticipated discoveries. As such, dynamic consent is a new concept or a new consent model that is gaining support in the field. It engages all three pillars of informed consent, namely information, comprehension and voluntariness. It does so by providing a centralized computational platform that allows personalized online consent such that the consent by a potential participant can be a) done in real-time, b) granted to any researchers of choice, c) for any duration of choice, and d) for any purposes of choice. Dynamic consent promises even more granular controls of genomic data sharing by allowing the participants to control what specific portion of their genomic data can be shared, such as hiding sensitive data in specific disease genes like APOE, BRCA1/2 and other cancer predisposition genes, or neuropsychiatric disease genes.

Alternative to any consent model is the ownership-based governance. The patients or participants of any genomic study ultimately own their data, and should have the governance of the data, which includes the right to control the data and also the right to assess the value of the data, with value being economic or intellectual. This provides the ultimate and most granular control of the participant's data but requires a distributed model that 1) is participant-centric, 2) does not require any centralized management, and 3) provides the fine-grained control of the participant's data. This model comes with significant technical challenges for the participants: a) to control what (portion of) data to share, with whom and for what duration, b) to track or trace data access, c) to prevent unauthorized access, d) to prevent or deter illicit duplication and usage of the data, and e) to potentially benefit financially from sharing the data.

Either dynamic consent or ownership-based governance of accessing or sharing the genomic sequencing data, however, requires robust informatics tools to enable and to facilitate, in order to deal with the associated complexity while ensuring privacy preservation. Such algorithms or tools, however, are severely lacking. For example, there is currently a significant lack of computational or informatics tools to enable the implementation of any real ownership-based governance. Currently, the genomic sequencing data of an individual is shared or not shared, decrypted or encrypted, all as a whole. This makes executing dynamic consent or honoring data owner's privacy concerns extremely challenging. As an example, the General Data Protection Regulation recently established by the European Parliament and Council of the European Union clearly defines the right of a participant of any study to revoke the consent. As it is now, however, once a participant consents to a study, which later combines and shares data with other studies, there is no practical way to erase the data and to prevent it from being used in the future. Furthermore, there is no practical way to track the distribution of the data and identify usage of the data that does not comply with the consent provided by the participant.

SUMMARY

The disclosure addresses the above-described challenges by providing two sets of algorithms and methods that are usable (individually or in cooperation) to protect and secure patient data. In particular, the disclosed algorithms and methods may be used to provide a) a dynamic privacy preserving encryption scheme for data such as genomic sequencing data (e.g., to dynamically encrypt and decrypt genomic sequencing data of user-specified genomic regions, such as specific genes (e.g. APOE and BRCA1/2)) and b) a dynamic, robust, and data utility preserving algorithm for watermarking genomic sequencing data. Fine-grained control policies, such as the time period when the data could be decrypted and accessed and/or the entity to which the data is allowed to be distributed, are enabled using attribute-based encryption and/or watermarking. With such features, the methods and systems of the disclosure enhance the privacy of the genomic sequencing data by: (1) giving full control over genomic data to the data owner; (2) enabling flexible, efficient, and precise partial encryption and decryption of genomic data. Furthermore, these algorithms, as detailed below, empower individual data owners and let them control when and for what purpose to share a specific portion of their genomic sequencing data, all in a reliable and auditable manner. These algorithms may provide for i) a reduction in the cost of implementing and maintaining a dynamic consent platform because of the distributed nature of ownership-based governance, ii) a promotion and facilitation of genomic data sharing, iii) a support of "consent revocation", and iv) a minimization of the "data holders" liability from improper handling of the participants' data and the inability to honor the decisions of the participants thoroughly and in real-time. In this way, the disclosed features provide technical solutions to achieve principles of the above-described dynamic consent and ownership-based governance models, as well as other enhanced user controls regarding access to data, usage of data, and tracking/auditing of data.

Example innovations described in the disclosure are the novel use of digital watermarking to enable the tracking and auditing of distributed data. The data is watermarked with selected watermarking elements (e.g., values of data, such as a selected alternate genomic base replacing a reference base determined by a sequence read) at selected locations in a file that are determined using a random seed that is based on a secret key.

Further example innovations described in the disclosure are the novel use of a block cipher mode of operation, and the way the encryption is applied to genomic data. The data is encrypted once using the master encryption key; the data can be discarded after that. A novel index structure is designed to facilitate fine-grained data region control, to make sure that no additional data is exposed. The index allows the data owner to build keystreams (derived from the master encryption key) that decrypt specific genomic regions without sharing the master encryption key with other entities, and without the need to store the actual data. In some examples, the watermarking innovations may be combined, in full or in part, with the encryption/decryption innovations to provide further control over the genomic data.

Achieving a trustworthy genomic data sharing is imperative if the benefits anticipated from large-scale data sharing are to be realized. The algorithms, methods, and systems described herein enable true ownership-based governance of genomic sequencing data and greatly simplify the attempts to implement dynamic patient consent for biomedical studies. Using the described mechanisms, the data owner will be able to specify and revoke authorizations for data access and use. Such owner-centered data management will improve the trust relationship between the data owner and the data users, removing the barriers for genomic data sharing. Furthermore, with greatly simplified ownership-based governance of the genomic sequencing data, the owner, instead of large diagnostic or healthcare companies that generate and hence control the genomic sequencing data, could potentially benefit financially from sharing his or her own data, as it should be. Furthermore, it is to be understood that genomic data is provided herein as an example, and the disclosed systems and methods may be applied to dynamically encrypt and/or decrypt any suitable data or file type.

The foregoing and other objects, features, and advantages of the invention will become more apparent from the following detailed description, which proceeds with reference to the accompanying figures.

DETAILED DESCRIPTION

Figure 1A:
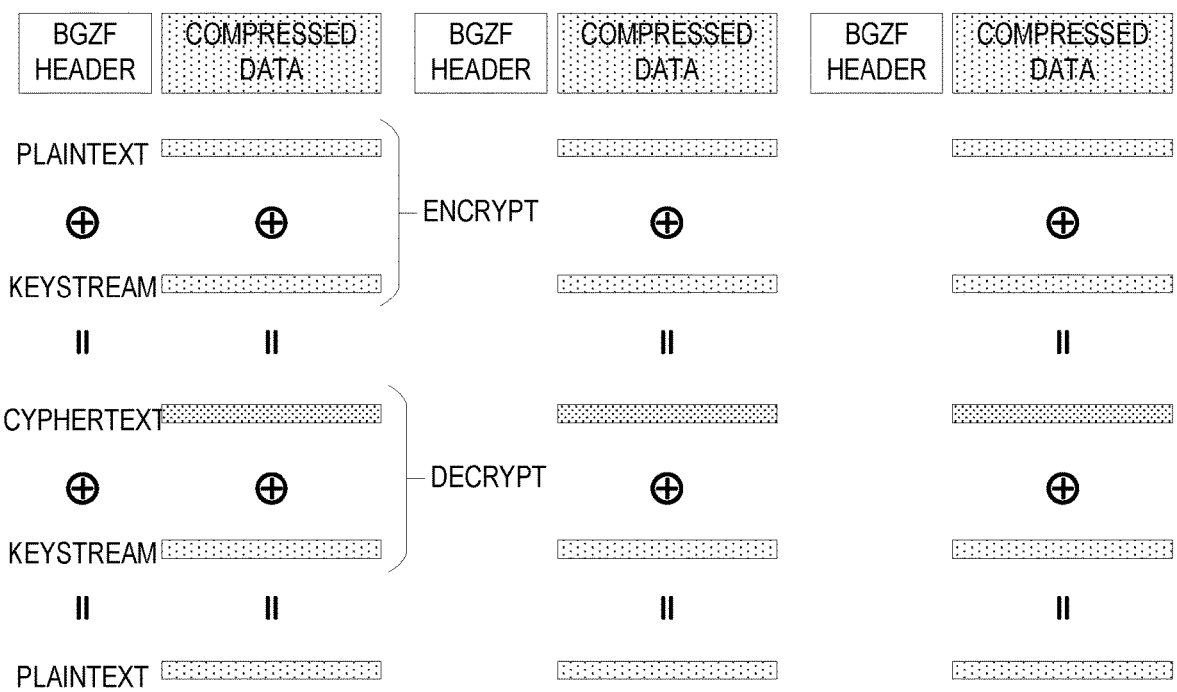
FIG. 1A shows an illustrative diagram of an example dynamic encryption and decryption algorithm in accordance with embodiments of the present disclosure.

The disclosure provides mechanisms that may be used individually and/or collaboratively in any combination to increase a data owner's control over the sharing of data. As will be described in more detail below, the mechanisms may include dynamic encryption and/or decryption of all or a part of a file storing the data (e.g., to prevent or deter unauthorized access to the data in a granular manner) as well as dynamic watermarking of all or a part of a file storing the data (e.g., to track and/or provide an auditing trail for identifying unauthorized use/distribution of the data and/or to verify the data). As used herein, watermarking may refer to digital watermarking, or the embedding of a marker within noise (e.g., sequencing errors, in the case of genomic data) of a data file, whereby the digital watermark is only perceptible under certain conditions (e.g., after applying an algorithm) and otherwise does not have a perceptible effect on the data quality and data integrity. While these mechanisms may be used for the protection of genomic data, as described in some of the examples below, it is to be understood that the mechanisms may also be applied to other types of data in other formats.

Using genomic data as an example, the disclosure provides for an implementation of a dynamic privacy preserving encryption scheme for genomic sequencing data stored in the standard Binary Alignment Map (BAM) files. The following describes example features of dynamic encryption/decryption as applied in an example genomic data scenario. Either the whole BAM file or a portion of the file can be encrypted. The owner of the genomic data can choose to share keystreams to decrypt specific genomic regions of the encrypted BAM file. BAM files are compressed using a variant of GZIP (GNU ZIP), called BGZF (Blocked GNU Zip Format). BGZF files are split into small blocks, which are compressed individually. This block structure allows to build indexes for sorted compressed files, and to extract specific regions without having to decompress the entire file.

In some examples, BAM files may be large and may include many compressed BGZF blocks. The size of an uncompressed block, and therefore the compressed block, may be limited by $2^{16}$ bytes. Each block has an uncompressed header that contains the size of the compressed block. A BAM file starts with a main uncompressed BAM header. Since an entire BGZF block is compressed, the encryption has to be applied on the block level. The BAM files are sorted and indexed for random access. The indexing scheme is optimized to reduce the number of seek operations within a file, rather than to facilitate fine-grained region access. After the seek operation finds a BGZF block that precedes the region of interest, a linear search is typically needed to find aligned reads that overlap with the requested region.

BGZF block-level encryption was implemented as a proof of concept, and is available as a branch of BCFTools. The encryption scheme is based on the Advanced Encryption Standard (AES-256) symmetric key algorithm. A BGZF file (VCF, BCF or BAM) is encrypted on block-level, so that the encrypted file is indexable for random access. The implemented scheme uses AES library functions directly, and the encrypted data is padded to 256-byte AES blocks. AES initialization keys are stored in the BGZF headers, and the file can be decrypted with a single secret AES key. Ultimately, given the secret AES key, any part of the file can be decrypted and no specific regions can be kept private.

Figure 1B:
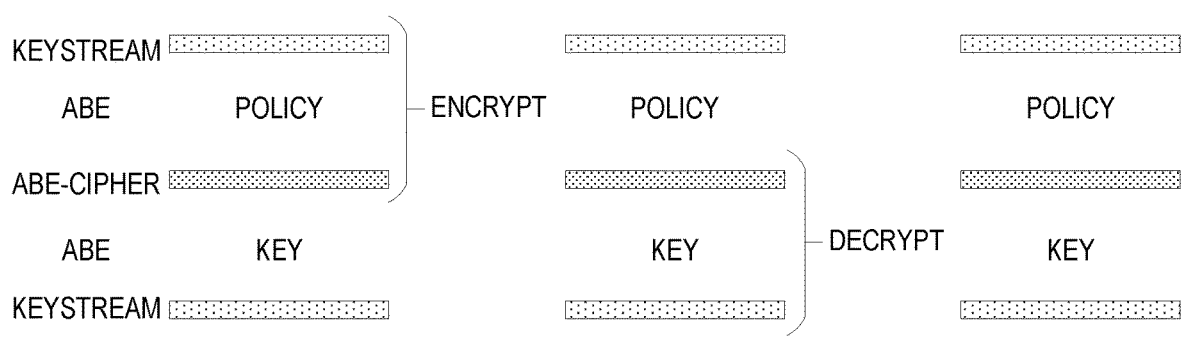
FIG. 1B shows an illustrative diagram of an example of fine-grained control over the dynamic encryption and decryption enabled via the attribute-based encryption (ABE) in accordance with embodiments of the present disclosure.
Figure 1C:
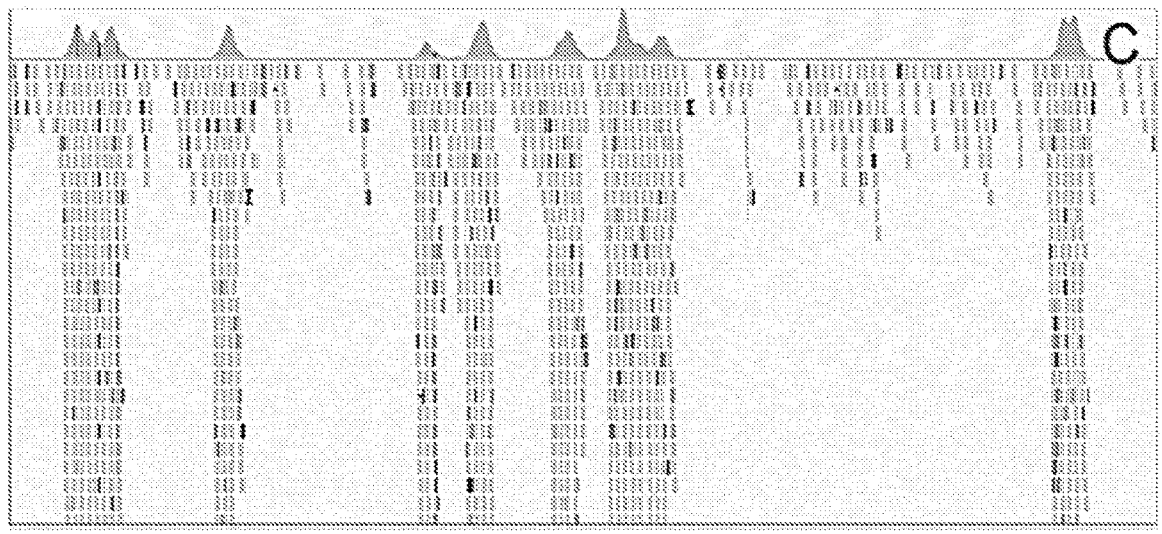
FIG. 1C shows an example visualization of a whole-exome sequencing BAM file across the exons of APOE and neighboring genes in accordance with embodiments of the present disclosure.
Figure 1D:
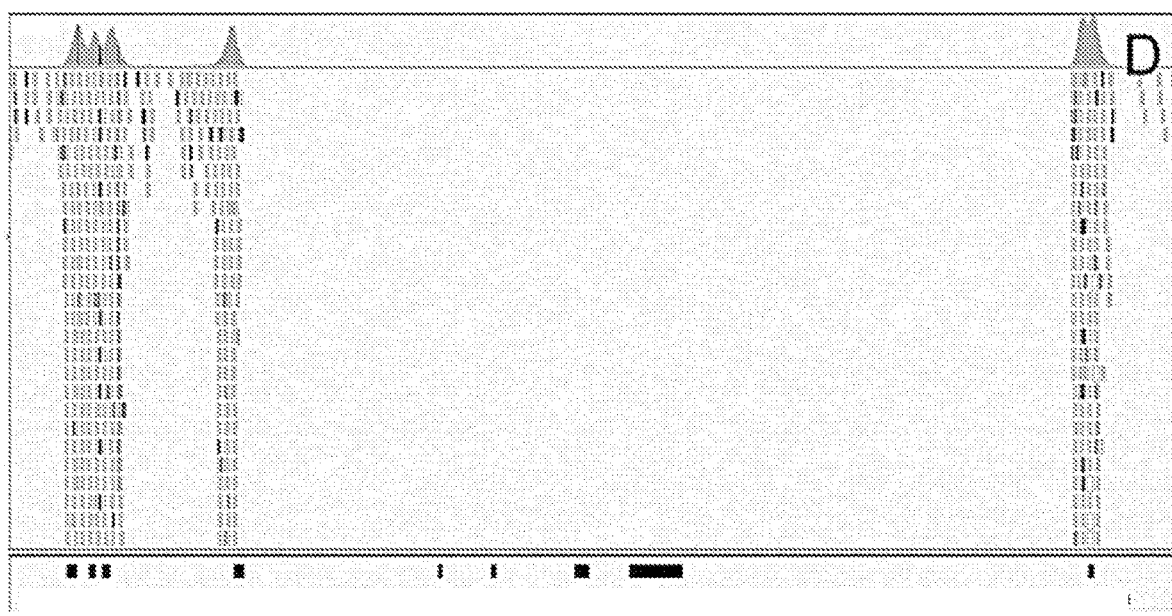
FIG. 1D shows an example visualization of the same BAM file of FIG. 1C after dynamic encryption of the APOE locus but not the neighboring genes in accordance with embodiments of the present disclosure.

FIGS. 1A-1D show examples relating to dynamic encryption and decryption of a BAM file. FIG. 1A shows an illustrative diagram of the dynamic encryption and decryption algorithm. FIG. 1B shows an illustrative diagram of fine-grained control over the dynamic encryption and decryption enabled via the attribute-based encryption (ABE). FIG. 1C shows an example visualization of a whole-exome sequencing BAM file across the exons of APOE and neighboring genes. FIG. 1D shows an example visualization of the same BAM file after dynamic encryption of the APOE locus but not the neighboring genes. To implement a dynamic encryption scheme (e.g., as an alternative to the above-described encryption scheme), an example approach of this disclosure instead utilizes AES-CTR—randomized CTR-mode with 128-bit key AES [RFC 3686], as shown in FIG. 1A. Each AES encrypt operation generates 128 bits of keystream. AES-CTR encryption is the XOR of the keystream with the plaintext. AES-CTR decryption is the XOR of the keystream with the ciphertext. If the generated key stream is longer than the plaintext or ciphertext, the extra key stream bits are simply discarded. For this reason, AES-CTR does not require the plaintext to be padded to a multiple of the AES block size.

In an example, the Binary BAM file (plaintext) is broken into L blocks (m[i]). The size of each block (with a possible exception of the last block) is 128 bits. Encryption algorithm chooses (at random) a new initialization vector (IV) for every BAM file. To enable a partial decryption of the BAM file, the disclosed approach includes revealing only the corresponding portion of the generated key stream. The secret AES key k and IV-s are never exposed. For example, to allow decryption of the blocks c[0] and c[1] only, two blocks of the key stream (AES(k,IV) AES(k,IV)) will be revealed. Thereby, only two blocks of the plaintext (m[0] and m[1]) will be decrypted.

In more details, the main BAM header and the BGZF block headers are left unencrypted. BGZF headers of the encrypted blocks are replaced with GZ-compatible custom BGZF headers to distinguish them from unencrypted blocks. When the whole genome or a specific region of a fully or partially encrypted BAM file is requested, the program will check whether a block is encrypted or not, and will process the blocks that are either unencrypted or have the corresponding keystreams available.

To generate keystreams for specific BGZF blocks, the offsets of the blocks from the beginning of the file, as well as the lengths of the blocks, may be determined. Both offsets and lengths can be extracted from the unencrypted BAM during the encryption procedure, but subsequently the file itself is not needed to generate the keystreams. To jump to the correct block given a genomic region (or a specific gene name), the left-most and the right-most positions of the aligned reads present in the block may be determined. Thus, during the encryption procedure, as the unencrypted BAM is processed, the block index is simultaneously built, for example by writing the following values for each block:

chromosome leftmost_position rightmost_position offset length

Since the block index file is in a BED-like format, it is BGZF-compressed and indexed for random access.

The end of the main BAM index is the start of the portion of the file that can potentially be encrypted. By calculating the number of bits between the end of the BAM header and the beginning of the BGZF block, the first initialization vector (IV) corresponding to the BGZF block is determined, and the offset from the beginning of the 128-bit AES block is also determined. The keystream is then generated by repeatedly calling the AES(k,IV) function for all 128-bit intervals of the BGZF block.

Fully or partially encrypted BAM files cannot be indexed with HTSLib samtools index.

Therefore, the BAM index is built on the fly, while processing the data, just before the data is encrypted. Each block is processed in the following steps: 1. Read the block from the file and decompress. 2. Get the start and end positions for each read and save them with the read offset from the start of the block. 3. Update the block encryption index. 4. Update the BAM index using the saved read positions and offsets. 5. Encrypt the compressed block if needed. 6. Write the block out. The BGZF index is needed for random access within the encrypted BAM file, but is not relied upon to generate the keystreams.

The dynamic encryption application, LUBA-PrivET (Privacy Enabling Tool), is implemented as a fast and easy to use command-line application written in C++. Aside from addressing privacy concerns, the LUBA-PrivET system is further extended with the support for flexible, fine-grained policies using the Ciphertext Policy (CP) Attribute-Based Encryption (ABE) encryption. ABE is a type of public key encryption that supports fine-grained access control policies that are cryptographically enforced. Data objects are encrypted using a set of attributes typically expressed as logical combinations referencing attributes of the requester, environment, or the data object. In LUBA-PrivET, as in other CP-ABE systems, attributes are associated with data owner's preferences and policies are bound with each ciphertext (see FIG. 1B). A user can decrypt a ciphertext if and only if the user's attributes satisfy the policy.

Enforcing ABE policies, however, requires auditing data transactions and keeping track of shared genomic data. Watermarking may enable support for detection of unauthorized data sharing and use (e.g., an encrypted BAM file being shared with another institution without the data owner's consent, specified in the ABE policy), support for consent revocation and enforcement of time-based constraints (e.g., an encrypted BAM file should not be accessed or shared before the release date or after the expiration date, as specified in the ABE policy), and support for accountability and audit. Other watermarking schemes do not support such properties.

A watermarking scheme applied to genomic data, or any data, may aim to ensure detectability, data utility preservation, robustness, and traceability. Detectability means that it should be possible (e.g., for a data owner with access to an algorithm or other mechanism associated with the application of the watermark) to discover the watermark in a file, or even a portion of a file, with a high degree of confidence, for example, to detect an unauthorized sharing of a data set. Data utility preservation means that the quality of the shared genomic data is not reduced as a result of watermarking, and that the watermarked data does not lead to erroneous scientific conclusions. A watermarking scheme is robust if it is very difficult or impossible to identify and remove the watermark for unauthorized use. A robust watermark scheme should offer strong resistance to collusion attacks, attempting to identify and remove the watermarks by comparing multiple copies of the same data set, each with a its own watermark. Last, traceability is the ability to identify the parties responsible for unauthorized sharing of the data with a high probability.

Therefore, the disclosure provides for implementations of a novel dynamic watermarking scheme to deter unauthorized sharing of the genomic data with third parties. Example implementations employ long watermarks (with a set of watermark elements being of a considerable size), to ensure robustness in protecting a whole as well as a partial data set.

The watermarking algorithm guarantees robustness by relying upon a secret key, making watermarking discovery prohibitively expensive. In different examples, the secret key used for watermarking data may be different than, the same as, related to, or completely independent from the secret key used in dynamically encrypting/decrypting the data (e.g., as described herein). The watermark is hidden within the inherent noise (e.g., sequencing errors) present in the genomic data. The algorithm provides resistance to collusion attacks by watermarking the same data given to multiple parties with watermarks that are different, yet share a common subset of watermark elements. The disclosed watermarking scheme allows easy identification of parties responsible for unauthorized data sharing with a high confidence, even when only a portion of the data set is shared or when the data set is further modified (e.g., in order to damage the watermark). By selecting different but overlapping watermarks, the disclosed dynamic watermarking scheme enables secure sharing of the same data set multiple times: with multiple different entities, or even with the same entity at different times for different purposes. Watermark discovery for auditing purposes can be automated with the disclosed scheme and associated tools. This is very important since dynamic watermarking of data given to different entities and at different times offers a greater degree of control for data owners, and facilitates the monetization of the genomic sequencing data.

Specifically, the disclosed watermark may include a set of base alterations spread uniformly across the entire genome, as in a whole-genome sequencing (WGS) data set, or across the target regions, as in a whole-exome sequencing (WES) data set. At each watermark position, a base is switched from the reference to one of the three possible alternative bases (e.g., ref base A: A→C, A→G, A→T). Typically, a base is modified in a single sequence read, although in special cases (e.g., BAM files with very high depth of coverage and high base variation) multiple reads may be altered. This modification is done in a deterministic but unpredictable way based on a secret key. The combination of watermark positions and spiked-in ALT bases ("watermark elements") makes up the watermark that can be dynamically generated each time a data set is shared. To check whether the watermark is present in a given BAM file, the same sequence of watermark elements will be generated based on the secret key and used to compare with the BAM file in question.

Before watermarking, the genome or target regions is/are concatenated into one long interval of size L, with each position in L mapped to a unique genome position. A genomic sequence (e.g., a short read) is aligned to a reference sequence (e.g., genome) by finding the region of the reference sequence to which the genomic sequence maps to (e.g., the substring of the reference sequence to which the genomic sequence is the most similar). The density of the watermark is therefore $D_{wv}=N_{wv}/L$, where $N_{wv}$ is the number of the watermark positions. To select the watermark positions, a method may include first generating a random seed with SHA-256 secure hash algorithm using information derived from the secret key, this will be the BAM file master seed. For example, to increase security properties, instead of hashing the secret key directly to generate the random seed, a block of data (e.g., a block consisting of all 1s) may be encrypted first (e.g., using the secret key) and the result of the encryption (e.g., ciphertext) may be fed into the secure hash function to generate the seed. With the master seed, the method may then include generating an ordered pseudorandom set of $\alpha N_{wv}$ integers, where $1<\alpha<2$, that are uniformly distributed between 0 and L. Each of the numbers can be mapped to a unique genomic position. The generated set is the pool of all possible watermark positions.

Next, the method may include generating an additional random seed with SHA-256 from the information about the entity the file is being shared with, the validity time period, and/or other attributes as desired by the owner and defined in the ABE policy. With the entity/time specific seed, the NW, entity- and time-specific watermark positions may be selected from the pool. To generate the watermark at each of the selected watermark position subsequently, the method may include generating a pseudorandom integer between 1 and 3 with the master seed. This number will define the transition of the reference base to one of the alternative bases in the ordered set: {A, C, T, G}. For example, if the generated pseudorandom integer is a 2, the alternative base may correspond to the base that is two places away from the reference base for a given location (e.g., one of the unique genomic positions associated with one of the ordered pseudorandom set of $\alpha N_{wv}$ integers discussed above). The reference base may refer to the expected base (determined by a genomic map) for the given location. For example, due to the aligned nature of the data as discussed above, each unique genomic position is mapped to a reference base value corresponding to that genomic position in a reference genome (e.g., a consensus genome sequence). Accordingly, in the above example, if the reference base is "A" for the given location and the generated pseudorandom integer is "2," then the transition at the given location would correspond to modifying the "A" to "T" (e.g., the base that is two places away from the "A" in the ordered set {A, C, T, G}).

Before inserting the base alterations, however, the method may include making sure that each selected position meets a certain criteria. For example, positions that may be ignored (e.g., not included as watermark element candidates that will potentially have their reference base switched to the selected alternative base) may include positions with insufficient (user-defined) depth of coverage (category 1), positions with multiple reads that have the watermark ALT base (category 2), and positions with exactly one read that has the watermark ALT (category 3). As used herein, depth of coverage may refer to the number of unique reads that include a given nucleotide (or base) in the reconstructed sequence. The remaining watermark positions will have no reads with watermark ALT base (category 4), and therefore can be used for watermarking. The BAM file may be modified accordingly at the category 4 positions (e.g., to switch the reference base at those positions to the ALT base). The category 3 positions are essentially the watermark elements present in a BAM file by chance. Since the watermark positions are entity- and time-specific, the watermarked BAM file is thereby entity- and time-specific. The typical numbers and percentages of positions that fall into each of the 4 categories for a WES BAM when 35,000 watermark positions are selected, or a targeted resequencing BAM (~5,000× across 0.3 mb) when 300 watermark positions are selected, are given in Supplementary Table 1.

TABLE 1

Four categories of potential watermarking positions in two typical types of BAM files.

| | CES BAM (from 35000 randomly selected positions) | High-depth (~5,000X) panel BAM (from 300 randomly selected positions) |
|---|---|---|
| Insufficient depth | 1820 (6%) | 2 (0.7%) |
| Multiple reads with ALT | 937 (3%) | 153 (55%) |
| Exactly one read with ALT | 3378 (11%) | 38 (14%) |
| No reads with ALT-usable | 25608 (81%) | 84 (30%) |

In some cases, when data has a high error rate and/or a high depth of coverage, the number of watermark elements present in data by chance (category 3) may be too large to rely on a single read containing the alternative watermark base at a watermark position. To further separate the number of positions at which the data can be modified (category 4) from the category 3 positions, the watermark elements can be comprised of multiple reads with the same alternative watermark base at the watermark position (in practice, 2 or 3 reads may be used). Thereby, the category 3 positions will contain the exact (threshold) number of the reads with the alternative base, while at category 4 positions the number of reads with the alternative base will be below the threshold. This generalized watermarking approach will result in more reads being modified. However, since it will be applied only to data with a high degree of base variation, the data utility will not be affected. Additional features to reduce an effect of watermarking on the overall quality of the data are described below.

For example, to preserve data utility, the method may include assigning low base qualities to the modified bases. Before inserting the watermark ALT bases, the method may include surveying the entire BAM file to select the most appropriate quality score to assign to the modified bases. In an example WES BAM that was tested, the most frequent lower base quality was 14 (Supplementary Table 2). This example BAM file contains 144,139,671 reads for a total of 14,465,720,620 bases. A very large watermark of 35,000 elements (which will result in approximately one element per 1 Kbp) may thereby be introduced by modifying 35,000 or only 0.02% of all reads, or altering 35,000 or only 0.00025% of all bases. And, the original BAM file contains 99,365,989 reads with at least one base of quality 14, which is 2,839 times more than the number of reads that are modified in this example. The disclosed watermarking scheme therefore preserves data quality, since these percentages are well below the sequencing errors of even the best sequencing technologies available, and the low-quality bases changes are expected to have an even lesser effect. When applying the watermarking scheme to a high-depth (~5,000×) targeted resequencing (~0.3 mb) data set, in one example it was found that the most frequent low base quality was 12 (Supplementary Table 3). In this target resequencing BAM file, there are 12,594,656 reads for a total of 1,244,786,684 bases. When 300 watermark positions were chosen, the example method hence modified 300 or only 0.0024% of all reads, and altered 300 or only 0.000024% of all bases. The original BAM has 4172,027 reads with at least one base of quality 12 already, and 11,012,889 bases with quality score of 12. Changing 300 bases in 300 reads to base quality of 12, therefore, would increase at most 0.0072% of such reads and 0.0027% of such bases. Again, data utility is not affected, since the above percentages are magnitudes below the error rate of the best sequencing technologies.

TABLE 2

Base quality composition of a typical whole-exome sequencing BAM file.

| Base quality score | Percentage of bases |
|---|---|
| 2 | 0.10% |
| 14 | 6.22% |
| 21 | 1.12% |
| 27 | 1.80% |
| 32 | 11.85% |
| 36 | 78.90% |

TABLE 3

Base quality composition of a typical targeted high-depth resequencing BAM file.

| Base quality score | Percentage of bases |
|---|---|
| 2 | 0.06% |
| 10 | 0.15% |
| 11 | 0.50% |
| 12 | 0.88% |
| 13 | 0.43% |
| 14 | 0.13% |
| 15 | 0.02% |
| 16 | 0.46% |
| 17 | 0.76% |
| 18 | 0.63% |
| 19 | 0.49% |
| 20 | 0.15% |
| 21 | 0.11% |
| 22 | 0.11% |
| 23 | 0.19% |
| 24 | 0.31% |
| 25 | 0.73% |
| 26 | 3.59% |
| 27 | 23.20% |
| 28 | 57.76% |
| 29 | 8.11% |
| 30 | 0.79% |
| 31 | 0.40% |
| 32 | 0.02% |
| 33 | 0.01% |
| 34 | 0.01% |
| 35 | 0.01% |
| 36 | 0.02% |

The disclosed watermarking scheme supports detectability. Given the secret key that was used to generate the watermark, 100% of all watermark elements may be recovered if the BAM file has not been further modified (Supplementary Table 4). In contrast, in an attempt to uncover the watermark using a random key that is different from the secret key used to generate the watermark, only 12% of all watermarks were uncovered for a typical WES BAM, and 30% for a high-depth targeted resequencing BAM (~5,000× across 0.3 mb) (Supplementary Table 5).

TABLE 4

Accurate discovery of all spiked-in watermarks with the correct secret key.

| | CES BAM | Targeted Resequencing BAM |
|---|---|---|
| Discovered watermark positions | 28986 (100%) | 122 (100%) |
| Not discovered watermark positions | 0 (0%) | 0 (0%) |

TABLE 5

Incomplete and inaccurate discovery of all spiked-in watermark elements with a random secret key.

| | CES BAM | Targeted Resequencing BAM |
|---|---|---|
| Discovered watermark positions | 3501 (12%) | 30 (31%) |
| Not discovered watermark positions | 25615 (88%) | 67 (69%) |

The disclosed dynamic watermarking algorithm supports traceability by identifying parties responsible for the unauthorized sharing with a high probability (even when they share a portion of the data or when they modify the data in order to damage the watermark). As described above, the watermark positions are drawn from the pool based on the additional seed that corresponds to the entity which the data is shared with and the time validity period. The unique watermarks guarantee that it can be reliably determined with whom and under which time constraints the BAM file in question was shared. Additional constraints can be added to the watermark, as needed. For example, any attribute of a policy relating to the usage of the data may be incorporated in the additional seed used to select the watermark positions from the pool, in combination with or as an alternative to the entity and/or time validity information described above. The watermarking described herein may be dynamic in that watermarks are generated (e.g., at a time of distribution) for particular policies such that the same data may be shared with different entities, at multiple times, and/or repeatedly with the same entity and different policies may be preserved in the data via the different watermarks used each time the data is shared. Additionally, in some examples, the same data file may include multiple watermarks, where a portion of the data file is watermarked in accordance with a first policy associated with the corresponding portion of data (e.g., using watermark elements at watermark positions that are generated using information relating to the first policy) and a different portion of the data file is watermarked in accordance with a second policy (e.g., using watermark elements at watermark positions that are generated using information relating to the second policy).

A non-limiting example of a data usage policy includes giving a same entity two versions of the same data (e.g., the same BAM file) at substantially the same time, the two versions having two different watermarks respectively relating to two different policies for data usage. In the above example, the two different policies may relate to permissions for sharing (e.g., the first version may only be shared with a single person associated with the entity, such as a patient's personal physician, while the second version may be distributed to a group of people associated with the entity, such as all of the physicians at a medical center). The above example may be used in conjunction with the dynamic encryption described herein (e.g., where the dynamic encryption/decryption and the watermarking are configured in relation to the same policy). In this way, if the policy dictates that the single person has access to more or different portions of the BAM file (e.g., referred to in this example as a "highly private portion" of the BAM file) than the group of people, the dynamic encryption may be used to attempt to initially prevent the unauthorized access to the highly private portion of the BAM file (e.g., by sharing the decrypting keystream of that portion of the BAM file only with the single person) and the watermark will persist after decryption to track any unauthorized distribution/use of the data in the highly private portion after the single person decrypts the highly private portion of the BAM file (e.g., to maintain compliance with the data usage policies specified and/or consented to by the data owner). The dynamic watermarking and encryption/decryption may thus collaboratively provide an ecosystem for dynamic consent and ownership-based governance models for data usage.

Figure 2A:
FIG. 2A shows an example visualization of a BAM file via IGV, showing the existence of variant bases as the background noise of sequencing errors.
Figure 2B:
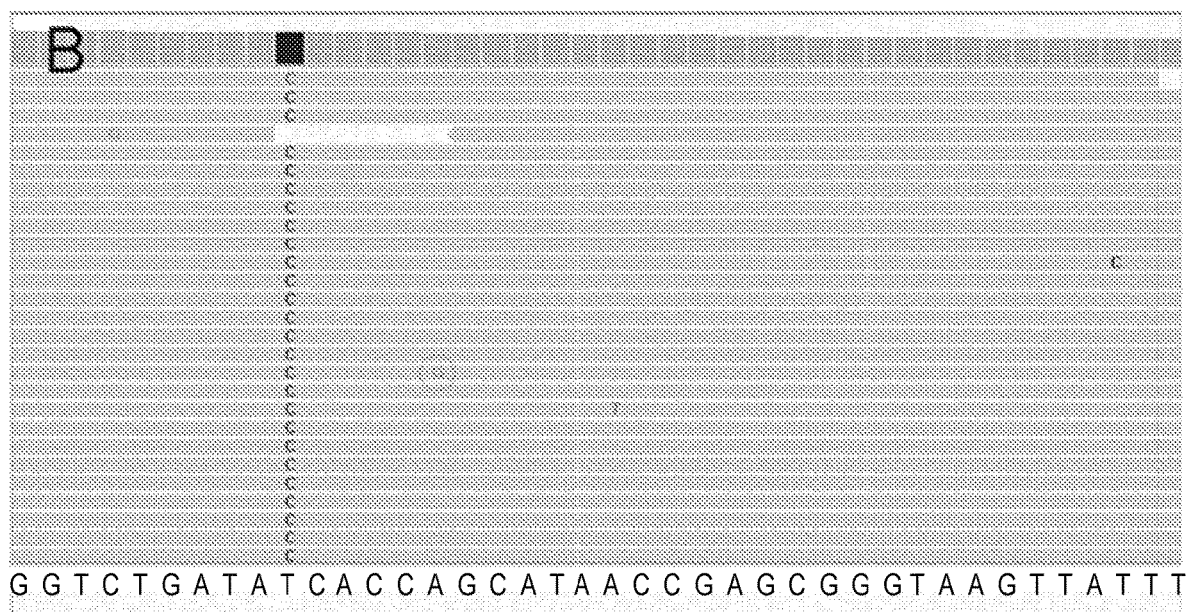
FIG. 2B shows an example visualization including a spiked-in watermark in the BAM file of FIG. 2A.

FIGS. 2A-2D show how dynamic watermarking may establish the ownership of a genomic sequencing data set unequivocally. In FIG. 2A, a visualization of an example BAM file via IGV shows the existence of variant bases as the background noise of sequencing errors. In FIG. 2B, the spiked-in watermark in the same BAM file (from FIG. 2A) is circled, but truly indistinguishable from other random sequencing errors.

Figure 2C:
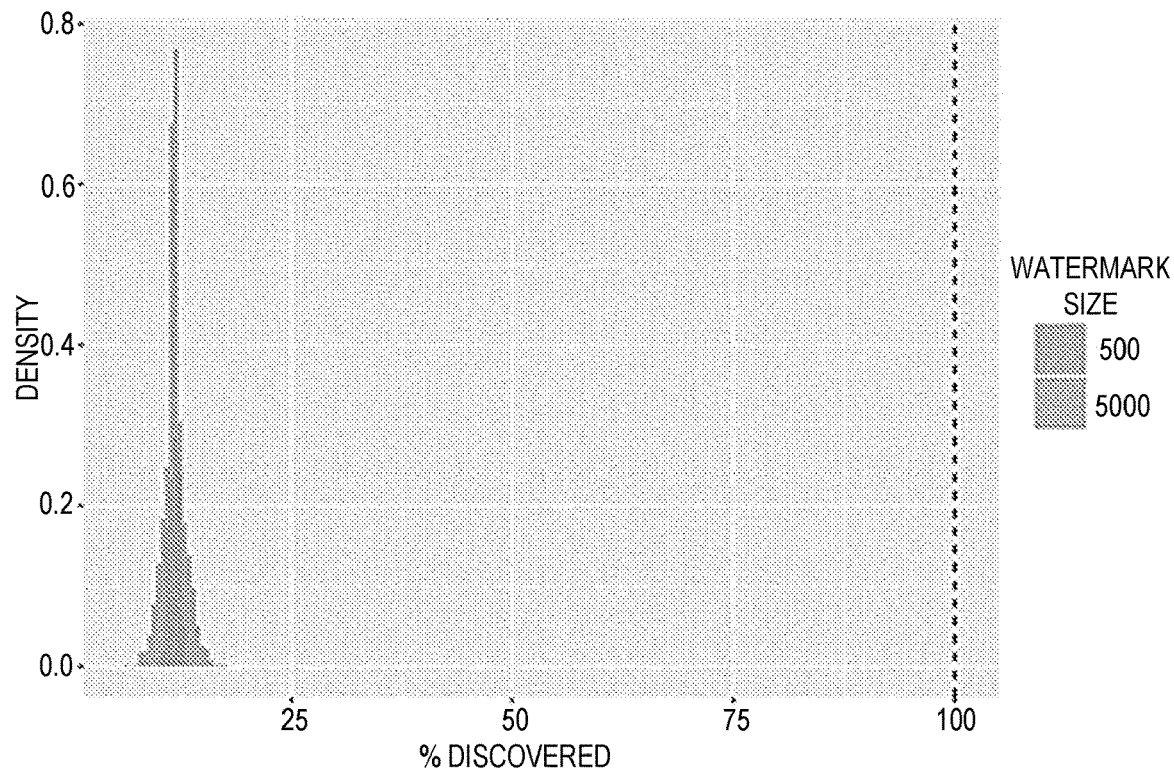
FIG. 2C shows an example plot of Monte Carlo simulations of the observed percentages of watermark elements that can be identified using random secret keys when different numbers of watermarking positions are used.
Figure 2D:
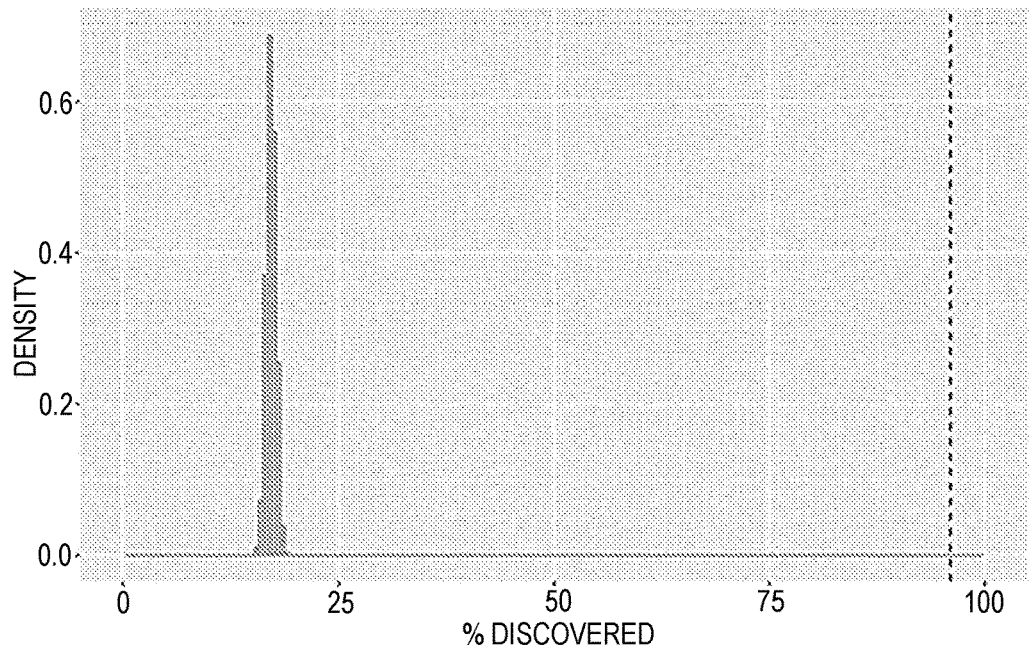
FIG. 2D shows an example plot of a Monte Carlo simulation of the observed percentages of watermark elements that can be identified when the BAM file was merged with another irrelevant BAM file using random secret keys.

To illustrate the performance of watermarking in accordance with the present disclosure, Monte Carlo simulations were employed to estimate the mean and standard deviation of the percentage of watermark elements that can be discovered by chance with an arbitrary seed, and this was compared to the percentage of elements discovered with the master seed corresponding to the secret key. FIG. 2C shows example plots of Monte Carlo simulations of the observed percentages of watermark elements that can be identified using random secret keys when different numbers of watermarking positions are used: (e.g., the darker region in the middle of the plots correspond to a watermark size of 5000 and the lighter region of the plots correspond to a watermark size of 500. FIG. 2D shows an example plot of a Monte Carlo simulation of the observed percentages of watermark elements that can be identified when the BAM file was merged with another irrelevant BAM file using random secret keys. In FIGS. 2C and 2D, the dotted line represents the percentage of watermark elements that were identifiable when the correct secret key was used.

The analysis included repeatedly generated different watermarks of the same size with random seeds. For each watermark, the percentage of watermark elements discovered in the BAM file, i.e., the ratio of the number of watermark positions with exactly one read containing the specific ALT base to the number of positions with no reads containing the ALT base, was then calculated. Given enough Monte-Carlo iterations, the analysis could then be used to estimate the sample mean and standard deviation, as well as the Z-score and p-value of discovering the true watermark by chance. For efficiency, the simulation was done with reduced watermarks. As noted above, FIG. 2C illustrates the results of the Monte Carlo simulations with watermarks down sampled to 5,000 and 500 elements, respectively, each with 1,000 simulations. For watermarks of size 5,000, the percentage of the watermark elements discovered with an arbitrary seed is typically less than 12%. In fact, the 95% confidence interval of the mean falls between 11.80-11.86%. As stated before, the disclosed algorithm could identify 100% of watermark elements when the master seed was used, which is 191 standard deviations away. In other words, the probability of revealing the embedded watermark by chance is close to 0. With only 500 watermark elements, the distribution of the percentage of watermark elements discovered by chance is slightly wider (see FIG. 2C). The 95% confidence interval of the mean falls between 11.75-11.93% and the Z score from the mean is 58 for 100% of all watermarks being discovered with a master seed. This shows the robustness of the disclosed watermarking algorithm, which is further illustrated by another simulation test. In this test, a watermarked CES BAM was merged with a randomly selected CES BAM file of another individual. With the master seed, the analysis could still identify 96% of the watermark elements, while a random seed allowed identification of only 18% of those watermarks (see Supplementary Table 6) in the merged BAM file. With Monte Carlo simulations performed on this merged CES BAM file, as above, it is shown that the 95% confidence interval of the mean of percentage of watermark elements discovered with an arbitrary seed falls between 17.13-17.20%, while the percentage of the watermark elements discovered with the master seed is 96%, which is 151 standard deviations away from the mean (see FIG. 2D).

TABLE 6

Accurate identification of most watermark elements in a typical
WES BAM, after merging with another randomly selected
WES file, with the original secret key and a random seed.

| Watermark position | Secret Key | Random Seed |
|---|---|---|
| Insufficient depth | 517 (1.6%) | 477 (1.5%) |
| Multiple reads with ALT | 4453 (14%) | 2086 (6.6%) |
| Exactly one read with ALT-discovered | 25583 (81%) | 5168 (16%) |
| No reads with ALT-not discovered | 1186 (3.7%) | 24077 (76%) |
| % discovered | 96% | 18% |

The disclosed watermarking scheme is very robust across a wide range of watermark sizes (the number of watermarking positions). Specifically, when as few as 100 watermark positions were used, only 17% of watermark elements were discovered by chance (see Supplementary Table 7). This is in comparison to 12% when 31,722 watermark positions were used, and the percentage remains relatively unchanged across different watermark sizes. In contrast, with the master seed, the disclosed algorithm could identify 100% of all watermarks, from as few as 100 to as many as 31,722 watermark positions in a typical WES BAM file (see Supplementary Table 8).

TABLE 7

Strong protection with the disclosed watermarking
scheme when a wide range of numbers of watermark
positions are used and tested, exemplified with a typical
WES BAM file (Part A). Columns "low depth", "multiple
alts", "alt discovered" and "not discovered"
are the 4 categories of positions encountered
when a BAM file is surveyed for a potential
watermark. The "% discovered" column lists the
percentage of watermark elements that can be
identified when a random seed is used.

| watermark size | low depth | multiple alts | alt discovered | not discovered | % discovered |
|---|---|---|---|---|---|
| 31722 | 5.5% | 2.7% | 11% | 81% | 12% |
| 10000 | 5.8% | 3% | 11% | 80% | 12% |
| 5000 | 5.6% | 3% | 11% | 80% | 13% |
| 1000 | 5.4% | 1.9% | 11% | 82% | 12% |
| 500 | 5.6% | 3.2% | 12% | 79% | 13% |
| 100 | 4% | 4% | 16% | 76% | 17% |

TABLE 8

Strong protection with the disclosed watermarking scheme
when a wide range of numbers of watermark positions are
used and tested, exemplified with a typical WES
BAM file (Part B). Columns "low depth", "multiple
alts", "alt discovered" and "not discovered" are
the 4 categories of positions encountered when a
BAM file is surveyed for potential watermarking
positions. The "% discovered" column lists the
percentage of watermark elements that can be
identified when the correct secret key is used.

| watermark size | low depth | multiple alts | alt discovered | not discovered | % discovered |
|---|---|---|---|---|---|
| 31722 | 5.7% | 2.9% | 91% | 0% | 100% |
| 10000 | 5.8% | 2.8% | 91% | 0% | 100% |
| 5000 | 5.5% | 2.8% | 92% | 0% | 100% |
| 1000 | 5.7% | 2.9% | 91% | 0% | 100% |
| 500 | 6% | 3.2% | 91% | 0% | 100% |
| 100 | 4% | 3% | 93% | 0% | 100% |

Figure 3B:
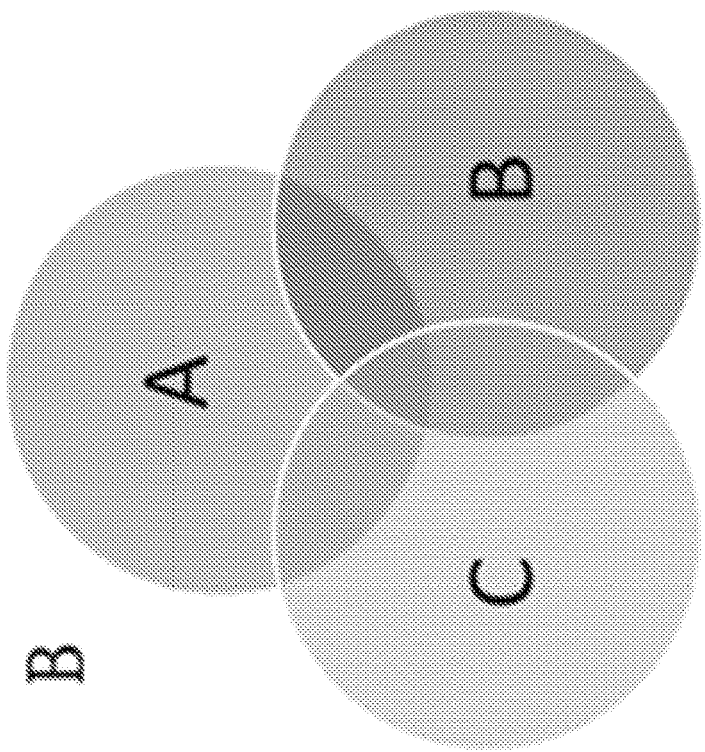
FIG. 3B shows an example Venn diagram of watermark positions in three example BAM files.
Figure 3A:
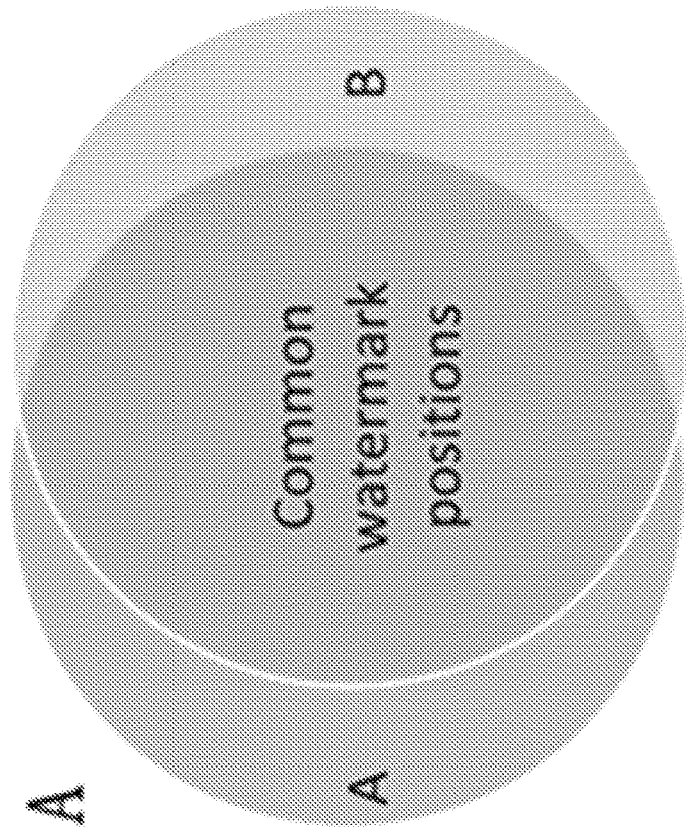
FIG. 3A shows an example Venn diagram of watermark positions in two example BAM files.

The disclosed watermark scheme is configured to provide strong protection against collusion attacks. Specifically, different watermarks may be embedded in the BAM files that are shared with different entities at a specific time. However, there are overlaps between watermarks in the data shared with different entities or with the same entity but at different times. The disclosed watermarking scheme offers strong protection against collusion attacks. In FIG. 3A, an example Venn diagram shows that the watermarks in the BAM files shared with two entities A & B are not identical, but overlap. While entities A and B can determine the reads different between the BAM files that they have received and remove them, the common watermark positions that cannot be discovered, will provide the evidence of the collusion. In FIG. 3B, an example Venn diagram illustrates the overlapping watermarks of BAM files shared with any two or all three entities A, B, and C. Suppose, entities A and B have colluded together and removed the reads that were different between their BAM files. The darkest section of the Venn diagram in FIG. 3B will provide the evidence that specifically A and B, but not C, altered the watermark. This way, while entities A and B can determine the differences between the BAM files that they each have received and try to remove the watermark elements maliciously, they could only identify and remove the reads that are different between the two BAM files, but will not be able to identify the common watermark elements shared between the files. Similarly, an entity would not be able to remove all watermarks by comparing multiple BAM files shared by the same patient with the entity at different times. Furthermore, as illustrated in FIG. 3B, when two entities A and B have colluded together, but not with entity C, and removed the reads that are different between their BAM files, the analysis of the remaining watermark elements will provide a clear evidence that A and B are responsible for the alteration. In this way, the mechanism by which the watermark is generated for the different entities as described herein may enable a targeted file to be evaluated to determine whether there is evidence that a specific one or more entities worked alone or in collusion to attempt to modify or remove all or a portion of the watermark.

In summary, the disclosure describes a novel algorithm that is designed and implemented for dynamic watermarking of genomic sequencing files (and/or other files). The generated watermark provides many desirable properties. First of all, it protects ownership, by providing the ability to reliably identify the provenance of a particular genomic sequencing file. Secondly, the watermarking scheme is resistant to detection, removal and modification by any data consumer. Thirdly, it offers protection against collusion attacks.

Fourthly, the disclosed scheme enables traceability and audit controls. Fourthly, the embedded watermark preserves data quality and data utility. Additionally, the dynamic nature of the watermarking scheme allows an individual to share his or her genomic sequencing data multiple times with multiple entities without losing the control, despite the fact that one's genome might be static and will not change overtime. It allows the truly ownership-based data governance and provides a way for the individual patients to benefit from monetizing their data, and gives the control to the patient instead of the diagnostic companies or the hospitals that did the sequencing. The disclosed watermarking scheme is therefore useful not only for ownership-based genomic data governance but also for any exchange or market place of genomic data sets.

As described herein, the watermarking scheme can be a stand-alone technology, and can also work in tandem with the disclosed dynamic encryption algorithm. The disclosed dynamic watermarking scheme can be especially useful when Attribute-based encryption (ABE) is added to support data policy enforcement, accounting and auditing. ABE encryption embeds attribute-based security/privacy policies in the encrypted data objects, thus making it impossible to remove or modify the policies. Once the data is decrypted, however, the association between the policy and the data object is broken. This makes data usage tracing and auditing extremely difficult, if possible at all. The described dynamic watermarking scheme can preserve this association by 1) supporting data ownership; 2) deriving the watermark elements directly from the ABE policy. The ABE policy can be treated as a string which is fed along with other parameters into the hash function to generate the secret seed that is used during watermarking. Even after the data is decrypted, the connection between the policy and the data persists. The corresponding policy may be checked by 1) determining the ownership of the data or 2) validating the watermark.

Any combination of the watermarking features described herein may be combined in any suitable manner with any combination of the dynamic encryption and decryption features described herein. For example, some of the dynamic encryption and decryption features are described in more detail below.

As noted above, among legal and ethical challenges, how best to manage informed consent is likely the most critical. To a large extent, the conventional static and paper-based informed consent at the time of study enrollment could not address the complexity and could not accommodate the wide range of genomic data sharing needs and requirements. This has created significant hurdles for effective utilization of genomic data for both research and clinical purposes. For this reason, dynamic consent, as a new and alternative approach to consent participants for biomedical studies has gained popularity recently with the dynamic, real-time and direct communication between participants and researchers enabled, while putting the participants at the center of decision making. Ideally, the decision as to a) whether or not to share the data, b) with whom to share the data, c) what data to share, d) in what format the data can be shared, and d) how long the data will be shared, can be rendered by a participant dynamically at any time. Despite its tremendous potential, however, there is a lack of informatics methodologies to execute or truly honor the decisions of a participant in real-time. And, a third party is still required to manage sharing preferences of all participants and to function as the communication or message broker between the participants and the researchers. The disclosure addresses these new challenges using the most cutting-edge bioinformatics and cryptographic technologies. In a preliminary study, the LUBA-PrivET software system was developed for dynamically encrypting and decrypting sequence or variant data of any particular genomic region(s) in a BAM file or a VCF file, which are the most common file format for storing NGS data and the standard format for storing genomic variants, respectively. Further implemented were time-based constraints using a keystream release policy to allow a participant to share data only for certain period of time. The disclosure also provides for extending LUBA-PrivET functionalities to further address other challenges outlined above, with three specific aims:

Specific Aim 1. Extend flexible attribute-based access control. Implemented within the LUBA-PrivET system according to the disclosure is the support for flexible, fine-grained policies using the attribute-based encryption (ABE). In addition to the time-based constraint, access can be further restricted or controlled based on other attributes, such as type of the data requestor (e.g., relative, member of a particular organization), country or location of the requestor, minimum age of the data owner at the time of data release, etc.

Specific Aim 2. Couple the system with the blockchain technology to track the data release and processing transactions. With dynamic consent, proper audit is critically important in order to maintain privacy and transparency. For this purpose, the LUBA-PrivET system can be coupled further with the blockchain technology to implement consistent and decentralized audit.

Specific Aim 3. Polishing and fully optimizing a secure and data utility preserving novel watermarking scheme for genomic data to deter and track unauthorized use of data. As described above, since the data consumers cannot be trusted to comply with the access control policies after the data is released, not to store and not to re-use the data after the expiration date/time, or not to distribute the data to unauthorized parties, a novel secure watermarking scheme has been devised, as described herein, for secure, traceable and auditable genomic data sharing. Its utility may be expanded by integrating it with the dynamic encryption algorithm (e.g., as described herein) and existing blockchain technologies.

Once fully implemented, the disclosed technologies may greatly empower genomic research and genomic medicine.

Research Strategy

A. Significance

Figure 4:
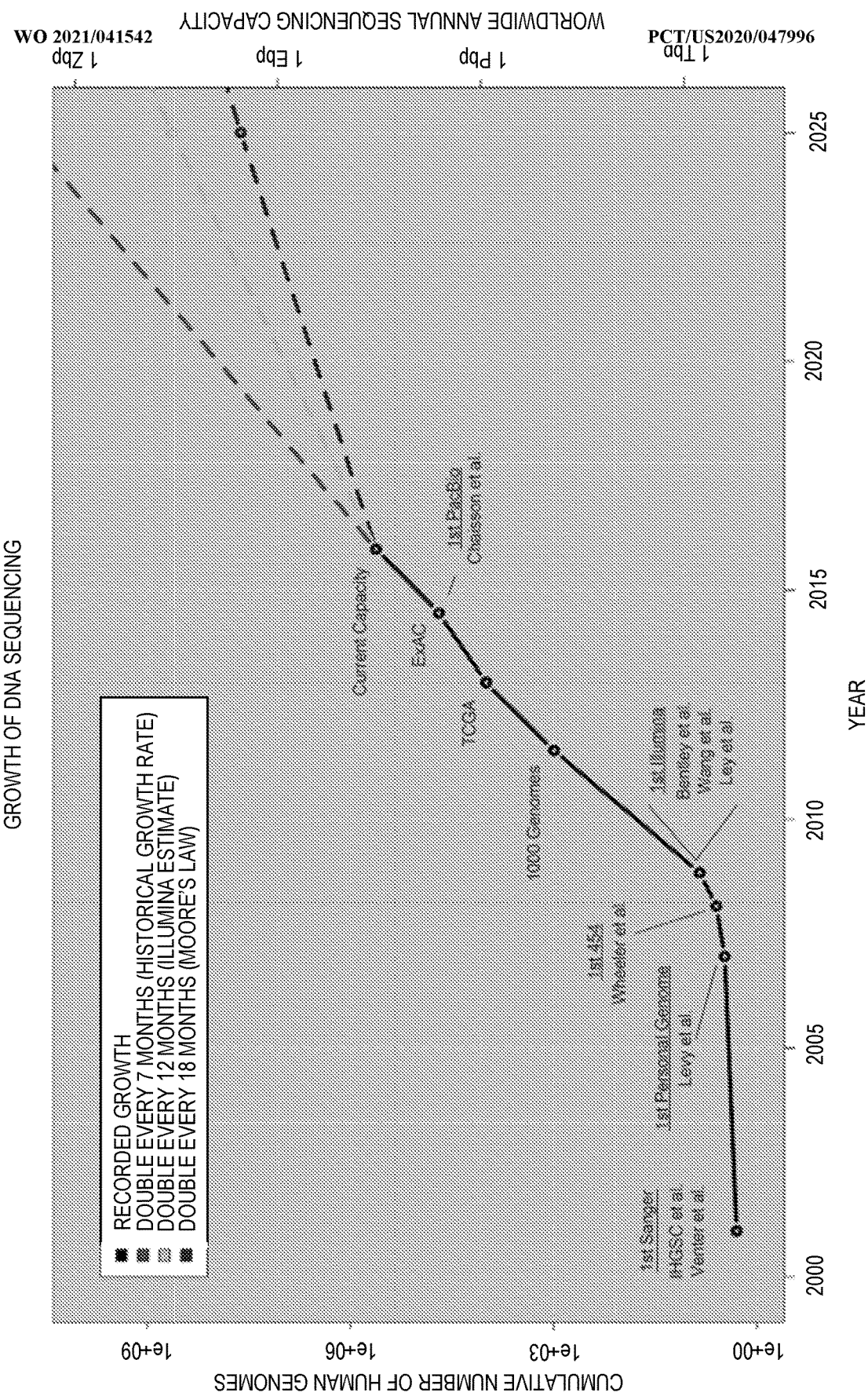
FIG. 4 shows an example plot of the growth of DNA sequencing.

In a perspective article, Stephens et al compared genomics with other major sources of Big Data including astronomy, and concluded that genomics was likely the most demanding in terms of all 4 major aspects of Big Data, namely data acquisition, storage, distribution, and analysis. The main figure of the article nicely illustrated the astronomical or rather genomical growth of DNA sequencing in terms of the overall sequencing capacity but also the number of human genomes sequenced each year and cumulatively (see FIG. 4). In FIG. 4, an example plot of the growth of DNA sequencing is shown. The plot shows the growth of DNA sequencing both in the total number of human genomes sequenced (left axis) as well as the worldwide annual sequencing capacity (right axis: Tera-basepairs (Tbp), Peta-basepairs (Pbp), Exa-basepairs (Ebp), Zetta-basepairs (Zbps)).

Cancer research benefits directly from the genomical (astronomical) growth of sequencing capacity, highlighted by The Cancer Genome Atlas program, the landmark cancer genomics study that started in 2006 with the advent of massively parallel sequencing technologies. With sequencing of over 20,000 primary cancers across 33 cancer types, there have been much increased understanding of the genomic alterations and landscapes of a variety of tumor types over the years, starting in 2008 for glioblastoma, and subsequently for ovarian cancers, colon and rectal cancers, breast cancers, lung cancers, melanoma, and prostate cancers, just to name a few. TCGA studies are of course not the only cancer genomic studies. There have continuously been more and larger genomic studies with more tumors studied, more patients involved, and more insights gained. This is driven largely by the drastically decreased sequencing cost and increased sequencing capacity over the last decade, but more importantly by the increased participation of cancer patients and the effective sharing of their genomic data across medical institutions and across the continents. Recognizing the power from, and the need for, sharing the genomics data, there have been a number of large international initiatives aiming to encourage and to facilitate genomic data sharing, exemplified by the International Cancer Genome Consortium (ICGC), started in 2007 in Canada, with now whole genome sequencing data of over 25,000 primary untreated cancers from 18 countries or jurisdictions readily accessible through the ICGC Data Portal. Like TCGA, ICGC has enabled a number of breakthrough discoveries, such as for myelodysplasia, for pediatric glioblastoma, and for medulloblastoma. There have also been many large genomic initiatives focusing on specific diseases including but not limited to specific types of cancers, such as the pancreatic cancer and the prostate cancer. Recognizing the benefits of genomic data sharing, for both clinical and research purposes, as well as the associated challenges, the Global Alliance for Genomics & Health (GA4GH), aims to develop consensus statements, guidelines, technical standards as well as software toolkits to facilitate genomic data sharing.

What constitutes the most appropriate informed consent is likely the most significant challenge, along with other ethical and legal issues. Dankar et al reviewed the evolution of the notion of informed consent and its importance in biomedical research most recently. The notion of informed consent emerged after decades of atrocities, followed by tremendous efforts to address the problem that resulted in The Nuremberg Code, The Declaration of Helsinki, the Common Rule, and the Belmont Report. Informed consent is now the essential component of any modern biomedical research involving human subjects. Information, comprehension and voluntariness are the three pillars that define informed consent in general as the full disclosure of the nature of the research and involvement of the participant, and adequate comprehension by the participant, followed by the participant's voluntary choice to participate or not.

Informed consent, as defined above, however, creates many challenges, including challenges in the forms of privacy and ethical issues, in the Big Data era or specifically the precision medicine era, which requires wide and extensive sharing of the genomic data by many institutions, across multiple studies and by a large number of investigators. First of all, anonymization of genomic data cannot guarantee privacy (e.g., privacy cannot be guaranteed when genomic data is shared regardless the amount of effort invested, certainly not with simple anonymization). Genomic data is recognized as an identifiable biometric according to HIPPA, since as few as 30-80 SNPs could uniquely identify an individual. Multiple studies clearly demonstrated the improbability of de-identifying genomic data completely: the identities of 50 anonymous male participants of the 1000 Genome Project were revealed by Bymrek et al. by analyzing the Y-chromosome and using surname inference; some participants of the Personal Genome Project could also be re-identified by triangulating the genomic data with demographic data; some participants of the 1000 Genome Project were re-identified using genealogical knowledge from publicly available records. The privacy risk extends to family members of the participants of a biomedical study. Secondly, the genomic data contains sensitive information such as the risks and predispositions to diseases such as cancers, Alzheimer's, and neuropsychiatric disorders. For this reason, Dr. James Watson requested that data from his ApoE gene redacted before making the genomic sequencing data available when his genome was sequenced. Although the Genetic Information Non-discrimination Act (GINA) was written in law in 2008, which prohibits any discrimination by insurers and employers based on the genetic traits of an individual, challenges in auditing and establishing the proof of non-compliance make it difficult to enforce it. Thirdly, the conventional informed consent is meant for a single study with well-specified design and goals at time of enrollment. It is therefore static and freezes the consent information at the time of consent (e.g., the consent information cannot be changed after the consent is given). This requires that all future uses of the data be disclosed at the initial consent, which is unrealistic or rather impossible in the Big Data era when data sharing, data repurposing and data aggregation happen frequently. Fourthly, the "information" and "comprehension" pillars of informed consent are challenged with genomic data sharing when it is a) impossible to estimate or quantify the risks, including especially the privacy risk as described above, b) difficult to foresee the usage and discovery of the data, and c) extremely complex to explain and understand the implications of genomic data sharing, largely because of the lack of such knowledge in the broader scientific community. Fifthly, consent revocation is an essential part of "voluntariness". It was declared, for example, by GDPR (General Data Protection Regulation) most recently that "it should be as easy to withdraw consent as to give it". Consent revocation, however, presents huge practical challenges when large volumes of genomic data are stored, managed and shared by many researchers across multiple institutions in different ways. The current practices typically apply withdrawal only to future data collection and processing, but not to the processed data that is in use already, which is not truly a withdrawal. As such, the conventional informed consent, which is meant for a well-defined study with clearly stated goals, time span, and well explained risks and benefits, is no longer suitable for current biomedical research involving collecting and analyzing the genomic data of the participants or patients. New approaches are needed.

One approach is to adopt the so-called "broad" or "blanket" consent that authorizes all, unlimited, and unforeseeable future usages, as done by most of biobanks and biomedical data warehouses. While promoted by some researchers, as well as the recent revision of the Common Rule, broad consent is criticized by many because of great restrictions it imposes in terms of the autonomy of potential participants. Although a variant of the broad consent, the tiered consent, lets participants select the general research areas to participate in, and hence provides them with more autonomy, neither broad nor tiered consent is comparable to the conventional informed consent when it comes to autonomy. Opt-out consent model is even more controversial and is considered by many as unethical, since it may take advantage of people in their most vulnerable moments.

Dynamic consent is a new consent model that enforces all three pillars of the informed consent. Dynamic consent can be a) done in real-time, b) granted to any entity or researcher of choice, c) for any duration of choice, and d) for any purpose of choice. Dynamic consent promises even more granular control of genomic data sharing by allowing the participants to specify, and therefore to control, what portion of, instead of all, the genomic data can be shared. For example, to hide sensitive data in specific disease genes like APOE, as was requested by Dr. Watson; BRCA1/2 and other cancer predisposition genes or neuropsychiatric disease genes. It should be particularly noted that dynamic consent is participant-centric, as it provides significantly more autonomy for the participants than conventional informed consent. Dynamic consent has been gaining significant popularity in the field of genomic medicine, since it addresses and overcomes many of the challenges described above, especially for participants or patients who have had their genomes or tumor genomes sequenced already. Practically, however, it comes with significant overhead and implementation cost because of the complexity of the system and the amount of computational resources required to manage the genomic data of all participants. Since the preferences are managed by a centralized computational system, this system becomes a single point-of-failure and an attractive target for malicious attacks.

Alternative to any consent model is the ownership-based governance. The patients or participants of any genomic study ultimately own their own data, and should have the governance of the data, which include the right to control the data and also the right to value of the data, being economic or intellectual. This is a distributed model that 1) is participant-centric, 2) does not require any centralized management, and 3) provides the ultimate and most granular control of the participant's data. This model comes with its own challenges, mainly the technical challenges for the participants, or the data owners, a) to control what (portion of) data to share, with whom and for what duration, b) to track or trace data access, c) to prevent malicious or unpermitted access, d) to prevent illicit duplication and usage of the data, and e) to potentially benefit financially from sharing the data. The disclosure relates to a set of cutting-edge bioinformatics algorithms and cryptographic software tools that address these technical challenges. These algorithms and tools can be used either as standalone tools for a number of situations or needed as described below, or as part of a dynamic consent platform. In the latter case, a hybrid model of dynamic consent and ownership-based governance is essentially provided. With such a model, it would i) drastically reduce the cost for implementing and maintaining a dynamic consent platform because of the distributed nature of ownership-based governance, ii) make it possible to establish a genomic data exchange to promote and to facilitate genomic data sharing, iii) make it truly possible for a participant to "revoke the consent" by simply not sharing the data anymore with anybody or any particular research of choice, and iv) relieve the "data holders" the liability from improper handling of the participants' data and the inability to honor the decisions of the participants thoroughly and in real-time.

B. Innovation

There does not appear to have been any bioinformatics tools that enable dynamic control as to whether or not genomic sequencing data of a particular genomic region or gene can be encrypted or decrypted, let alone dynamic controls as to with whom and for how long the data can be shared. In some examples, the disclosed systems and methods use the blockchain technology to track or audit data access, release and processing transactions. In addition to using blockchain technology for tracking the transactions of genomic data, the disclosure describes applying blockchain technology for dynamically encrypting and decrypting data belonging to any genomic regions of interest or choice. The disclosure also provides for watermarking genomic data and using the watermarking to enable and to facilitate genomic data sharing at the global level, and in the context of ownership-based governance. Together, the suite of algorithms and informatics solutions that are disclosed for genomic data sharing should be broadly enabling for both research, academic or commercial purposes, significantly impacting cancer research and clinical cancer care.

In one example, the LUBA-PrivET software system is configured for dynamically encrypting and decrypting sequence or variant data of any specified genomic region(s) in the most common file format for storing genomic sequencing data, the BAM format.

Dynamic Encryption and Decryption

1 Introduction

Figure 5A:
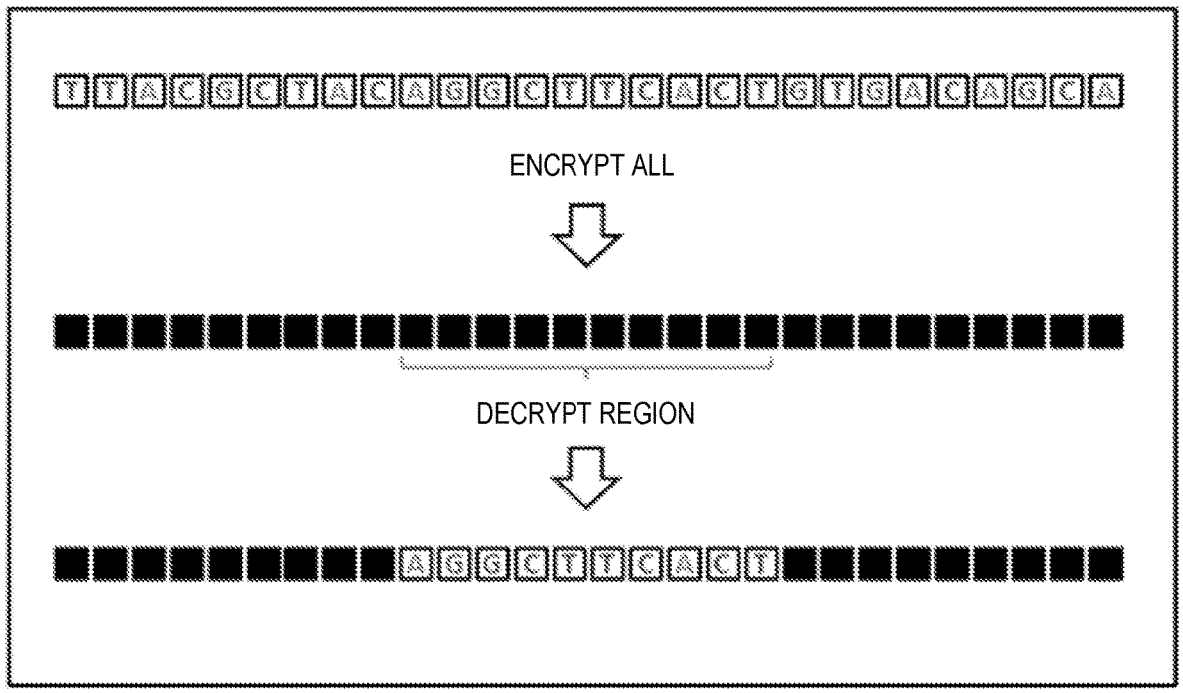
FIG. 5A schematically shows an example process for encrypting a whole BAM file.
Figure 5B:
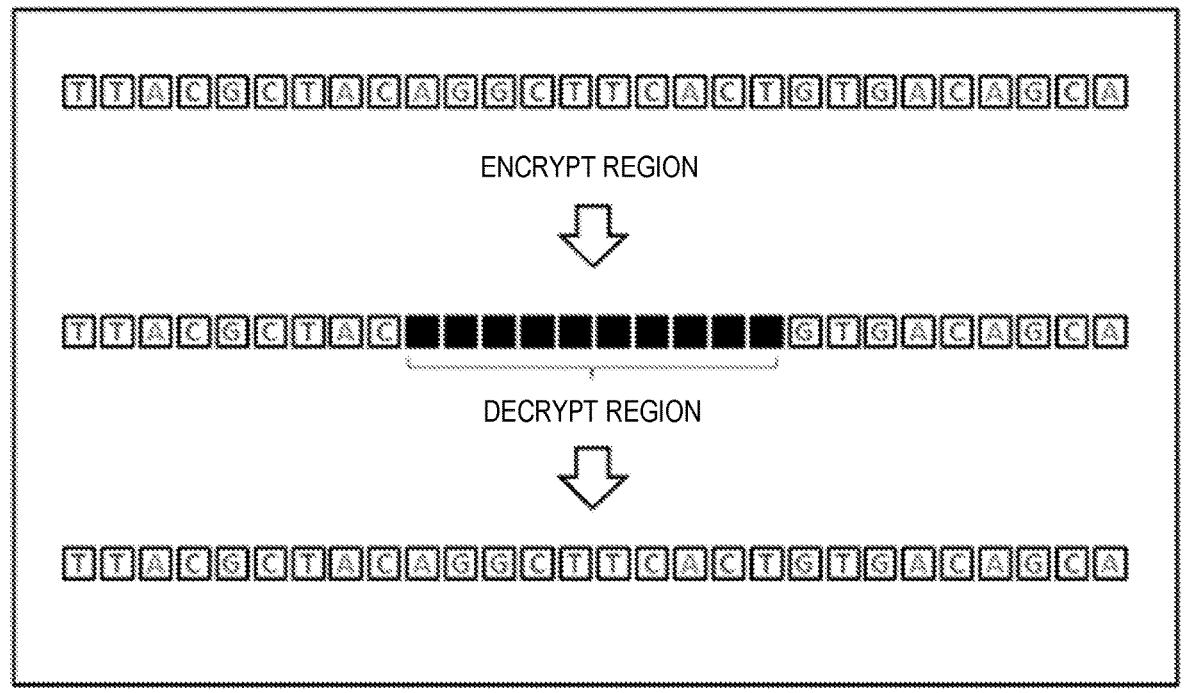
FIG. 5B schematically shows an example process for encrypting a genomic region.

The disclosure describes a dynamic privacy preserving encryption scheme for genomic sequencing data. Either the whole BAM file or a portion of the file can be encrypted. FIG. 5A shows an example process for encrypting a whole BAM file. The example includes an option to decrypt a specific genomic region or the whole BAM file. FIG. 5B shows an example process for encrypting a genomic region. The example has an option to decrypt the whole encrypted region or a part of it.

The owner of the genomic data can choose to share keystreams that decrypt specific genomic regions of the encrypted BAM file.

2 Sequencing Data Format

Aligned genomic sequences, or reads, are stored in Binary Alignment Map (BAM) files. BAM files are compressed using a variant of GZIP (GNU ZIP), called BGZF (Blocked GNU Zip Format). BGZF files are split into small blocks which are compressed individually. This block structure allows to build indexes for sorted compressed files, and to extract specific regions without having to decompress the entire file.

Figure 6:
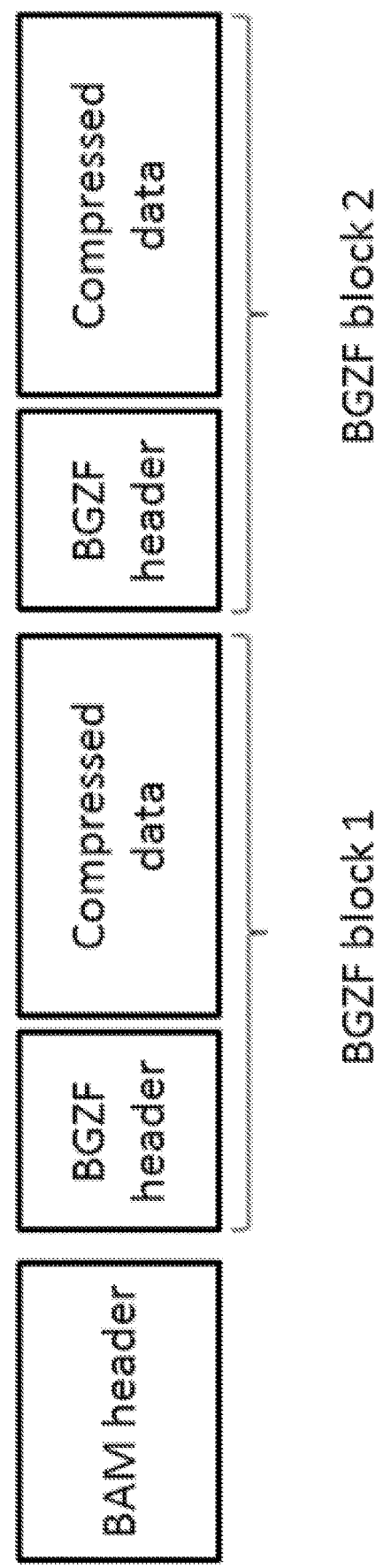
FIG. 6 schematically shows an example structure of BAM files.

Typically, BAM files are large and consist of many compressed BGZF blocks. The size of an uncompressed block, and therefore the compressed block, is limited by $2^{16}$ bytes. Each block has an uncompressed header that contains the size of the compressed block. A BAM file starts with a main uncompressed BAM header, as shown in FIG. 6.

Since an entire BGZF block is compressed, the encryption is applied on the block level. The BAM files are sorted and indexed for random access. The indexing scheme is optimized to reduce the number of seek operations within a file, rather than to facilitate fine-grained region access. After the seek operation finds a BGZF block that precedes the region of interest, a linear search is typically needed to find aligned reads that overlap with the requested region.

Related Work: "BGZF Block-Level Encryption for VCF, BCF, BAM (and Anything BGZF Compressed)"

BGZF block-level encryption was implemented as a proof of concept, and is available as a branch of BCFTools on github.

The encryption scheme is based on the Advanced Encryption Standard (AES-256) symmetric key algorithm. A BGZF file (VCF, BCF or BAM) is encrypted on block-level, so that the encrypted file is indexable for random access.

The implemented scheme uses AES library functions directly, and the encrypted data is padded to 256-byte AES blocks. AES initialization keys are stored in the BGZF headers, and the file can be decrypted with a single secret AES key. Ultimately, given the secret AES key, any part of the file can be decrypted: in contrast to the methods and systems of the present disclosure, specific regions cannot be kept private.

3. Dynamic Encryption Scheme

Figure 7A:
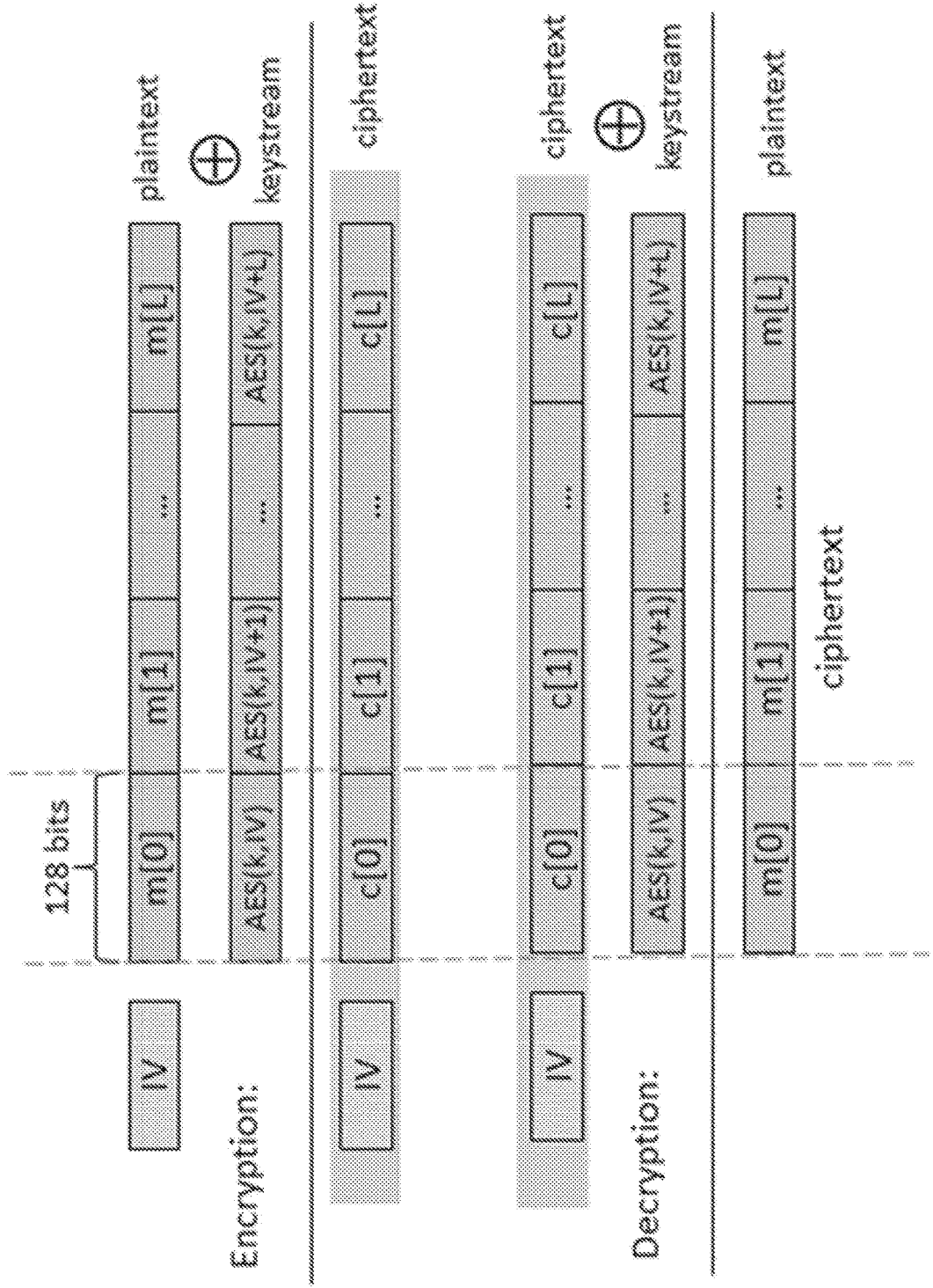
FIGS. 7A and 7B schematically show example encryption schemes in accordance with embodiments of the present disclosure.
Figure 7B:
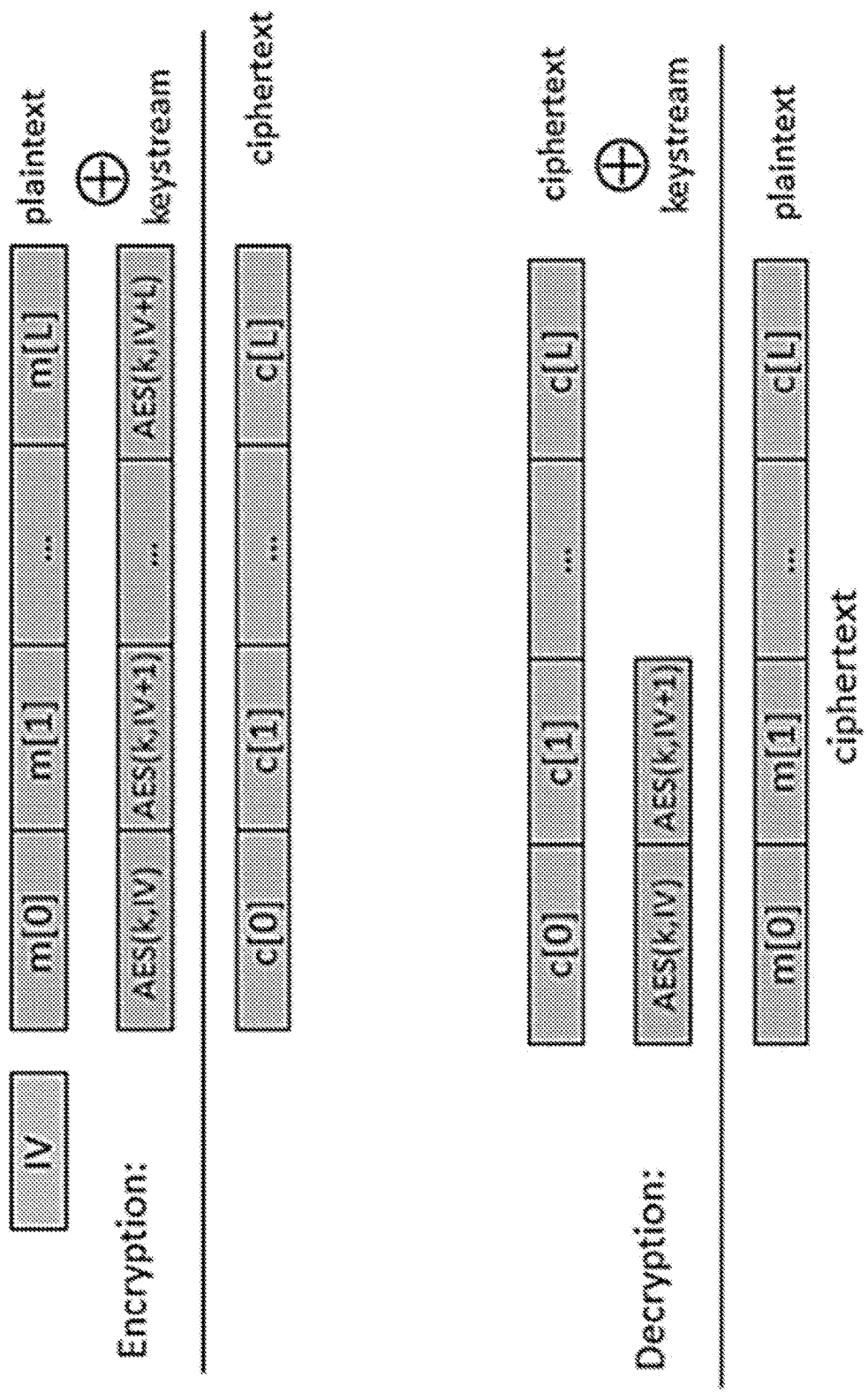

FIGS. 7A and 7B show example encryption schemes. To encrypt a BAM file, an embodiment of the disclosure includes utilizing AES-CTR—randomized CTR-mode with 128-bit key AES [RFC 3686].

Each AES encrypt operation generates 128 bits of keystream. AES-CTR encryption is the XOR of the keystream with the plaintext. AES-CTR decryption is the XOR of the keystream with the ciphertext. If the generated key stream is longer than the plaintext or ciphertext, the extra key stream bits are simply discarded. For this reason, AES-CTR does not require the plaintext to be padded to a multiple of the AES block size.

Binary BAM file (plaintext) is broken into L blocks (m[i]). The size of each block (with a possible exception of the last block) is 128 bits. Encryption algorithm chooses (at random) a new initialization vector (IV) for every BAM file.

To enable a partial decryption of the BAM file, only the corresponding portion of the generated key stream is revealed. The secret AES key k and IV-s are never exposed.

For example, to allow decryption of the blocks c[0] and c[1] only, two blocks of the key stream (AES(k,IV) AES(k, IV)) will be revealed. Thereby, only two blocks of the plaintext (m[0] and m[1]) will be decrypted.

4. Implementation Details

The main BAM header and the BGZF block headers are left unencrypted. BGZF headers of the encrypted blocks are replaced with GZ-compatible custom BGZF headers to distinguish them from unencrypted blocks. When the whole genome or a specific region of a fully or partially encrypted BAM file is requested, the program will check whether a block is encrypted or not, and will process the blocks that are either unencrypted or have the corresponding keystreams available.

To generate keystreams for specific BGZF blocks, the offsets of the blocks from the beginning of the file, as well as the lengths of the blocks are determined. Both offsets and lengths can be extracted from the unencrypted BAM during the encryption procedure, and subsequently the original file will not be needed to generate the keystreams.

To jump to the correct block given a genomic region (or a specific gene name), the left-most and the right-most positions of the aligned reads present in the block are determined. Thus, during the encryption procedure, as the unencrypted BAM is processed, the block index is built simultaneously, writing the following values for each block:

chromosome leftmost_position rightmost_position offset length

Since the block index file is in a BED-like format, it is BGZF-compressed and indexed for random access.

The end of the main BAM header is the start of the portion of the file that can potentially be encrypted. By calculating the number of bits between the end of the BAM header and the beginning of the BGZF block, the first initialization vector (IV) corresponding to the BGZF block is determined, and the offset from the beginning of the 128-bit AES block is also determined. The keystream is then generated by repeatedly calling the AES(k,IV) function for all 128-bit intervals of the BGZF block.

Fully or partially encrypted BAM files cannot be indexed with HTSLib samtools index. Therefore, the BAM index is built on the fly, while processing the data. Each BGZF block is processed in the following steps: 1. Read the block from the file and decompress. 2. Get the start and end positions for each read and save them along with the read offset from the start of the block. 3. Update the block encryption index. 4. Update the BAM index using the saved read positions and offsets. 5. Encrypt the compressed block if needed. 6. Write the block out. The BGZF index is needed for random access within the encrypted BAM file, but is not relied upon to generate the keystreams.

A dynamic encryption system, LUBA-PrivET (Privacy Enabling Tool), is implemented as part of the in-house software system LUBA (Lightweight Utility for Bioinformatics Analysis) that was developed at the Center for Personalized Medicine (CPM). Some examples of the system incorporate a number of tools and algorithms developed specifically for clinical needs: somatic variant caller, CNV algorithm, tool to resolve the phase of heterozygous variants, coverage analysis tool, and other utilities to compare and analyze VCF, BAM and FASTQ files. Similarly to other LUBA tools, LUBA-PrivET is a fast and easy to use command-line application written in C++.

In Section 6 a demo of the LUBA-PrivET tool is presented.

5. Contributions

With other mechanisms, it is practically impossible to encrypt the whole file and dynamically decrypt any part (e.g., just a part) of the file (e.g., using the same key). Similarly, the data owner, namely the individual or patient whose genome is sequenced, does not have effective and technical ways to claim the ownership of a genomic sequencing data set. Mechanisms for effective protection and for data sharing with different institutions at different times is desired in a protected and auditable manner do not exist. The novel applications of the CTR block cipher mode of operation described in this disclosure support dynamic partial encryption and decryption of BAM files employing just one key. In typical secret key cryptographic settings, the secret key has to be shared between the parties, increasing the attack surface. In the disclosed method, the secret master key that encrypts BAM file is never shared with any other entity, which results in a decreased attack surface and increased privacy protection. Further, the disclosed dynamic watermarking algorithm overcomes that, and enables the data of a rather static genome to be shared and monetized repeatedly, with multiple entities and at different times. Therefore, the algorithm is useful for any financial transactions involving genomic data.

Partially or fully encrypted genomic data can be stored in a public or a semi-public data storage, e.g., a Big Data platform, a cloud-based system. These data storage facilities cannot decrypt the encrypted information. The owner of the data can discard the large BAM file, since only the master key and a small block index file are needed for decryption. An access to specific genomic regions, which may be encrypted, can be given by the owner to trusted parties to conduct clinical analysis or research.

A custom lightweight index facilitates fast retrieval of block data needed for decryption. The index supports fine-grained control over the release of the sensitive genomic data—no additional information is revealed, thus increasing privacy guarantees.

The implementation disclosed herein is efficient and flexible. It relies on secret key cryptography, thus avoiding considerable overhead of the public key cryptography. Only a single secret key is required. Rapid cryptographic operations, based on a simple XOR, result in fast processing of large BAM files. The performance can be further improved by parallelizing the encryption and decryption procedures. The disclosed scheme requires no padding of the encrypted data: no extra storage is needed while the structure of a BAM file is preserved. AES can be replaced with other cryptographic constructions, for example, Salsa20.

6. LUBA-PrivET Dynamic Encryption Demo

Demo A: Hiding the Whole Genomic Sequence.

Figure 8:
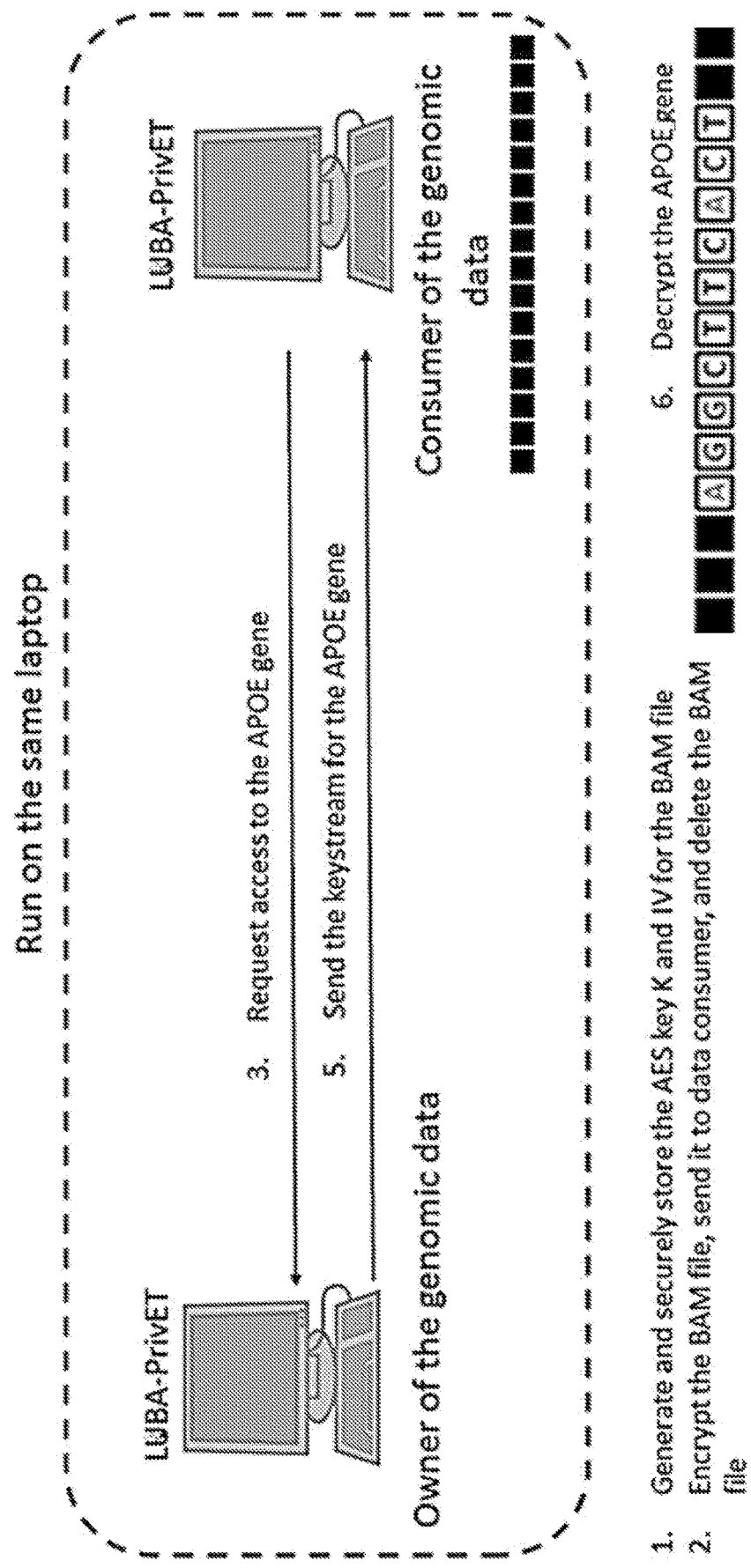
FIG. 8 schematically shows an example process for hiding a whole genomic sequence via an encryption scheme in accordance with embodiments of the present disclosure.

An example process for hiding the whole genomic sequence is schematically shown in FIG. 8. The Data Owner encrypts the original Bam file: three files are generated, AES Master key, LUBA Encryption Index and the fully encrypted BAM file:

data_owner$ ll
-rw-r--r-- 1 ayutov ayutov 523431006 May 14 13:38 CPM00000001.chr19.bam
-rw-r--r-- 1 ayutov ayutov 114096 May 14 15:46 CPM00000001.chr19.bam.bai
data_owner$ privet -m encrypt -b CPM00000001.chr19.bam
Output:
   AES Master key: "CPM00000001.chr19.aes_key.bin"
   LUBA Encryption Index: "CPM00000001.chr19.lei.gz"
   Fully encrypted BAM: "CPM00000001.chr19.enc.bam"
PrivET finished in 12 seconds.
data_owner$ ll
-rw-rw-r-- 1 ayutov ayutov 244 May 15 12:26 CPM00000001.chr19.aes_key.bin
-rw-r--r-- 1 ayutov ayutov 523431006 May 14 13:38 CPM00000001.chr19.bam
-rw-r--r-- 1 ayutov ayutov 114096 May 14 15:46 CPM00000001.chr19.bam.bai
-rw-rw-r-- 1 ayutov ayutov 523431006 May 15 12:26 CPM00000001.chr19.enc.bam
-rw-rw-r-- 1 ayutov ayutov 114096 May 15 12:26 CPM00000001.chr19.enc.bam.bai
-rw-rw-r-- 1 ayutov ayutov 602736 May 15 12:26 CPM00000001.chr19.lei.gz
-rw-rw-r-- 1 ayutov ayutov 8524 May 15 12:26 CPM00000001.chr19.lei.gz.tbi Data Owner "sends" the encrypted file to Data Consumer and deletes the original BAM:

data_owner$ privet -m keystream -l CPM00000001.chr19.lei.gz -r gene APOE -a CPM00000001.chr19.APOE.keystream.bin
Output:
   Keystream: "CPM00000001.chr19.APOE.keystream.bin" PrivET finished in 1 seconds.
data_owner$ ll
-rw-rw-r-- 1 ayutov ayutov 244 May 15 12:26 CPM00000001.chr19.aes_key.bin
-rw-rw-r-- 1 ayutov ayutov 163516 May 15 12:28 CPM00000001.chr19.APOE.keystream.bin
-rw-rw-r-- 1 ayutov ayutov 602736 May 15 12:26 CPM00000001.chr19.lei.gz
-rw-rw-r-- 1 ayutov ayutov 8524 May 15 12:26 CPM00000001.chr19.lei.gz.tbi
data_owner$ my CPM00000001.chr19.APOE.keystream.bin ~/data_consumer Now Data Consumer can extract the APOE region, and only the APOE region, from the encrypted BAM file with the APOE keystream, and view it with SAMTools or the IGV:

data_consumer$ privet -m view -b CPM00000001.chr19.enc.bam -r gene APOE -a CPM00000001.chr19.APOE.keystream.bin
Output
   Decrypted region(s) BAM: "CPM00000001.chr19.enc.dec.bam".
PrivET finished in 0 seconds.
data_consumer$ ll
-rw-rw-r-- 1 ayutov ayutov 163516 May 15 12:01 CPM00000001.chr19.APOE.keystream.bin
-rw-rw-r-- 1 ayutov ayutov 523431006 May 15 11:21 CPM00000001.chr19.enc.bam
-rw-rw-r-- 1 ayutov ayutov 114096 May 15 11:21 CPM00000001.chr19.enc.bam.bai
-rw-rw-r-- 1 ayutov ayutov 139104 May 15 12:02 CPM00000001.chr19.enc.dec.bam
-rw-rw-r-- 1 ayutov ayutov 22944 May 15 12:02 CPM00000001.chr19.enc.dec.bam.bai

```
data_consumer$ samtools view CPM00000001.chr19.enc.dec.bam | less
NB501047:10:HLJGYBGXX:3:12611:21719:9541 83 19 45409028 60 100M =
45408988 -140
TGGACAAGTCTGGGATCCTTGAGTCCTACTCAGCCCCAGCGGAGGTGAAGGACG

TCCTTCCCAAGGAGCCGGTGAGAAGCGCAGTCGGGGGCACGGGGAT

E//<AEEEE/AEE//AE/EE<EAE6//EEE/EE/E//</AEEEEEA<EEEEAEAEAEEEEEEEAAE/E

/EEE6EE/EAEEEE/EE/E/E/E/EEAAAAA NM:i:1 MD:Z:62C37 AS:i:95 XS:i:0

RG:Z:CPM00000001-B-D-3_20180104 MQ:i:60 ms:i:2572 mc:i:45408988 MC:Z:101M
``` data_owner$ my CPM00000001.chr19.enc.bam*~/data_consumer
data_owner$ rm CPM00000001.chr19.bam*

If Data Consumer attempts to look into the encrypted BAM files using SAMTools or the IGV (Integrated Genomic Viewer), an error message is thrown:

data_consumer$ samtools view CPM00000001.chr19.enc.bam
[main_samview] truncated file.

Data Owner is asked to open the APOE gene. She generates the APOE keystream with the AES Master key and the LEI file, and "sends" the keystream to Data Consumer:

The full original BAM file can be regenerated only with the AES Master key. Since Data Owner never shares her AES Master key, she requests the encrypted BAM to be sent back to her:

data_consumer$ cp CPM00000001.chr19.enc.bam*~/data_owner
data_owner$ privet -m decrypt -b CPM00000001.chr19.enc.bam -k CPM00000001.chr19.aes_key.bin -o CPM00000001.chr19.full.bam
PrivET finished in 6 seconds.
data_owner$ ll

```
-rw-rw-r-- 1 ayutov ayutov 244 May 15 12:16
CPM00000001.chr19.aes_key.bin
-rw-rw-r-- 1 ayutov ayutov 523431006 May 15 11:21
CPM00000001.chr19.enc.bam
-rw-rw-r-- 1 ayutov ayutov 114096 May 15 11:21
CPM00000001.chr19.enc.bam.bai
-rw-rw-r-- 1 ayutov ayutov 523431006 May 15 12:17
CPM00000001.chr19.full.bam
-rw-rw-r-- 1 ayutov ayutov 114096 May 15 12:17
CPM00000001.chr19.full.bam.bai
-rw-rw-r-- 1 ayutov ayutov 602736 May 15 12:26
CPM00000001.chr19.lei.gz
-rw-rw-r-- 1 ayutov ayutov 8524 May 15 12:26
CPM00000001.chr19.lei.gz.tbi
```

Demo B: Hiding the APOE Gene Only.

Figure 9:
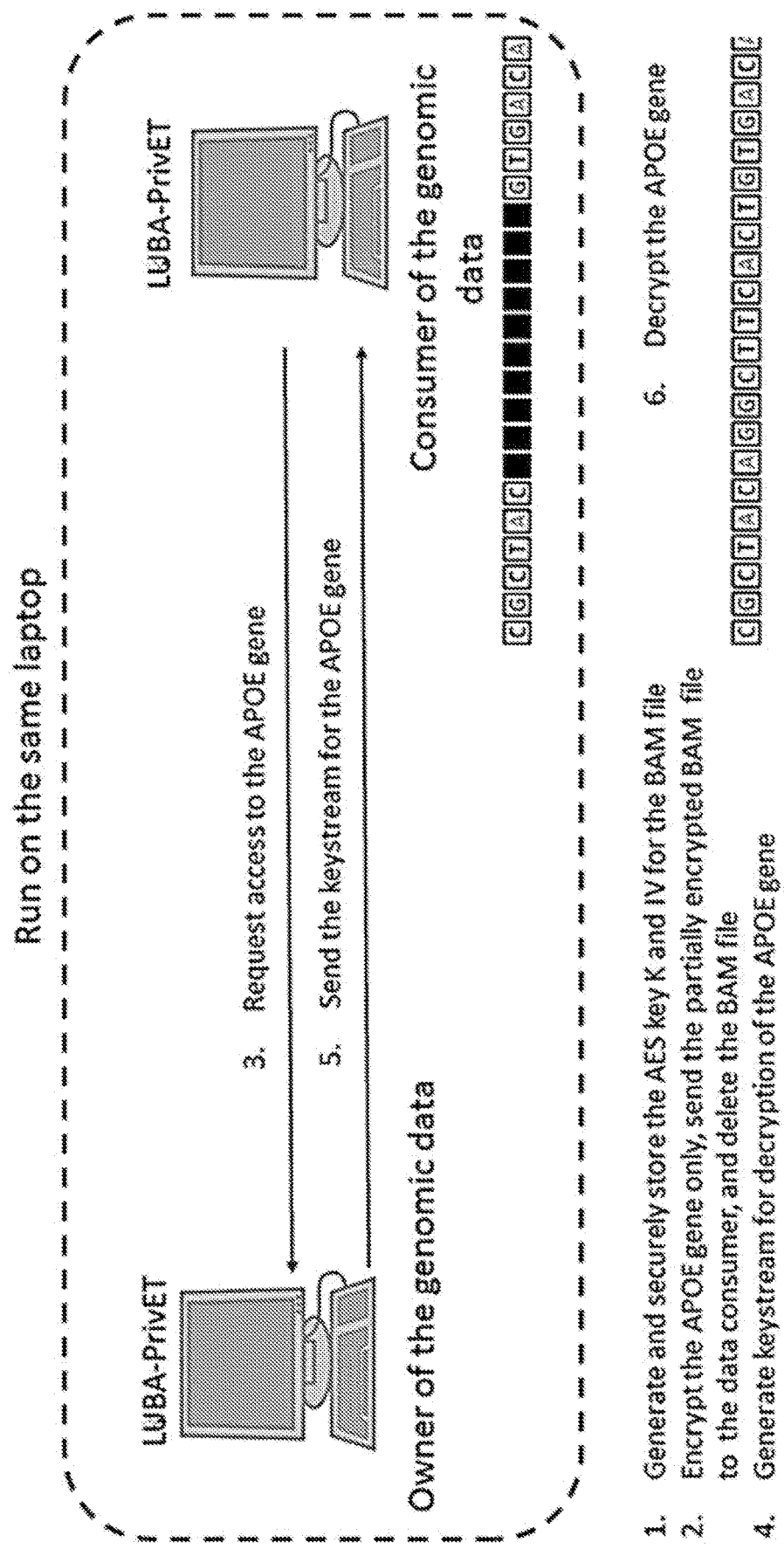
FIG. 9 schematically shows an example process for hiding a part of a genomic sequence (e.g., an APOE gene only) via an encryption scheme in accordance with embodiments of the present disclosure.

An example of hiding the APOE gene only is shown in FIG. 9. The Data Owner encrypts the APOE gene region in the BAM file: three files are generated, AES Master key, LUBA Encryption Index and the partially encrypted BAM file. Data Owner "sends" the partially encrypted file to Data Consumer and deletes the original BAM file.

```
data_owner$ ll
-rw-r--r-- 1 ayutov ayutov 342228992 May 15 11:10
CPM00000001.chr19.bam
-rw-r--r-- 1 ayutov ayutov 114096 May 14 15:46
CPM00000001.chr19.bam.bai
data_owner$   privet   -m   encrypt   -b
CPM00000001.chr19.bam -r gene APOE
Output:
    AES Master key: "CPM00000001.chr19.aes_key.bin"
    LUBA Encryption Index: "CPM00000001.chr19.lei.gz"
    Partially    encrypted    BAM:
"CPM00000001.chr19.part_enc.bam".
PrivET finished in 8 seconds.
data_owner$ ll
-rw-rw-r-- 1 ayutov ayutov 244 May 15 12:32
CPM00000001.chr19.aes_key.bin
-rw-r--r-- 1 ayutov ayutov 523431006 May 14 13:38
CPM00000001.chr19.bam
-rw-r--r-- 1 ayutov ayutov 114096 May 14 15:46
CPM00000001.chr19.bam.bai
-rw-rw-r-- 1 ayutov ayutov 328 May 15 12:32
CPM00000001.chr19.lei.gz
-rw-rw-r-- 1 ayutov ayutov 168 May 15 12:32
CPM00000001.chr19.lei.gz.tbi
-rw-rw-r-- 1 ayutov ayutov 523431034 May 15 12:32
CPM00000001.chr19.part_enc.bam
-rw-rw-r-- 1 ayutov ayutov 114096 May 15 12:32
CPM00000001.chr19.part_enc.bam.bai
data_owner$ my CPM00000001.chr19.part_enc.bam*~/
data_consumer
data_owner$ rm CPM00000001.chr19.bam*
```

Data Owner generates APOE keystream and "sends" it to Data Consumer:

```
data_owner$   privet   -m   keystream   -l
CPM00000001.chr19.lei.gz -r gene APOE -a
CPM00000001.chr19.APOE.keystream.bin
Output:
    Keystream:
"CPM00000001.chr19.APOE.keystream.bin"
PrivET finished in 0 seconds.
data_owner$ ll
-rw-rw-r-- 1 ayutov ayutov 244 May 15 12:32
CPM00000001.chr19.aes_key.bin
-rw-rw-r-- 1 ayutov ayutov 163516 May 15 12:35
CPM00000001.chr19.APOE.keystream.bin
-rw-rw-r-- 1 ayutov ayutov 328 May 15 12:32
CPM00000001.chr19.lei.gz
-rw-rw-r-- 1 ayutov ayutov 168 May 15 12:32
CPM00000001.chr19.lei.gz.tbi
data_owner$                               my
CPM00000001.chr19.APOE.keystream.bin    ~/data_con-
sumer
```

Without the keystream, Data Consumer has access to all Genomic regions, except for the APOE gene. SAMTools and IGV will report errors, if asked to jump to the APOE region:

```
data_consumer$ samtools view CPM00000001.chr19.part_enc.bam | less
NB501047:10:HLJGYBGXX:3:21611:9816:6866 163 19 60046 0101M = 60086
141
TTCTAACAGCAGAGCTGCCAGGCCAGGCCCTCAGGCAAGGGCTCTGAAGTCAGG

GTCACCTACTTGCCAGGGCCGATCTTGGTGCCATCCAGGGGGCCTCT

AAAAAEEEEEEEEEEEEEEEEEEEEEEEEEEEEAEEEEEEEEEEEAEEEEEEEEEEEEEEAEE

EEEEEEEAAEEEEEEEEEEEEEEEEEEEEAEEEEEE<EE<EEA NM:i:0 MD:Z:101

AS:i:101 XS:i:101 RG:Z:CPM00000001-B-D-3_20180104 MQ:i:0 ms:i:3484 mc:i:60186 MC:Z:101M
```

```
data_consumer$ samtools view CPM00000001.chr19.part_
enc.bam 19:45409125 [main_samview] retrieval of region
"19:45409125" failed due to truncated file or corrupt BAM
index file
```

Data Consumer decrypts the APOE region using the keystream received from Data Owner:

```
data_consumer$    privet    -m    view    -b
CPM00000001.chr19.part_enc.bam -r exon APOE -a
CPM00000001.chr19.APOE.keystream.bin
Output
    Decrypted region(s) BAM: "CPM00000001.chr19.part_
enc.dec.bam".
PrivET finished in 0 seconds.
data_consumer$ ll
-rw-rw-r-- 1 ayutov ayutov 163516 May 15 12:35
CPM00000001.chr19.APOE.keystream.bin
-rw-rw-r-- 1 ayutov ayutov 523431034 May 15 12:32
CPM00000001.chr19.part_enc.bam
-rw-rw-r-- 1 ayutov ayutov 114096 May 15 12:32
CPM00000001.chr19.part_enc.bam.bai
-rw-rw-r-- 1 ayutov ayutov 102711 May 15 12:38
CPM00000001.chr19.part_enc.dec.bam
-rw-rw-r-- 1 ayutov ayutov 22944 May 15 12:38
CPM00000001.chr19.part_enc.dec.bam.bai
```

Now, Data Consumer can extract the decrypted APOE gene as well as other regions from the partially encrypted BAM file.

Figure 10:
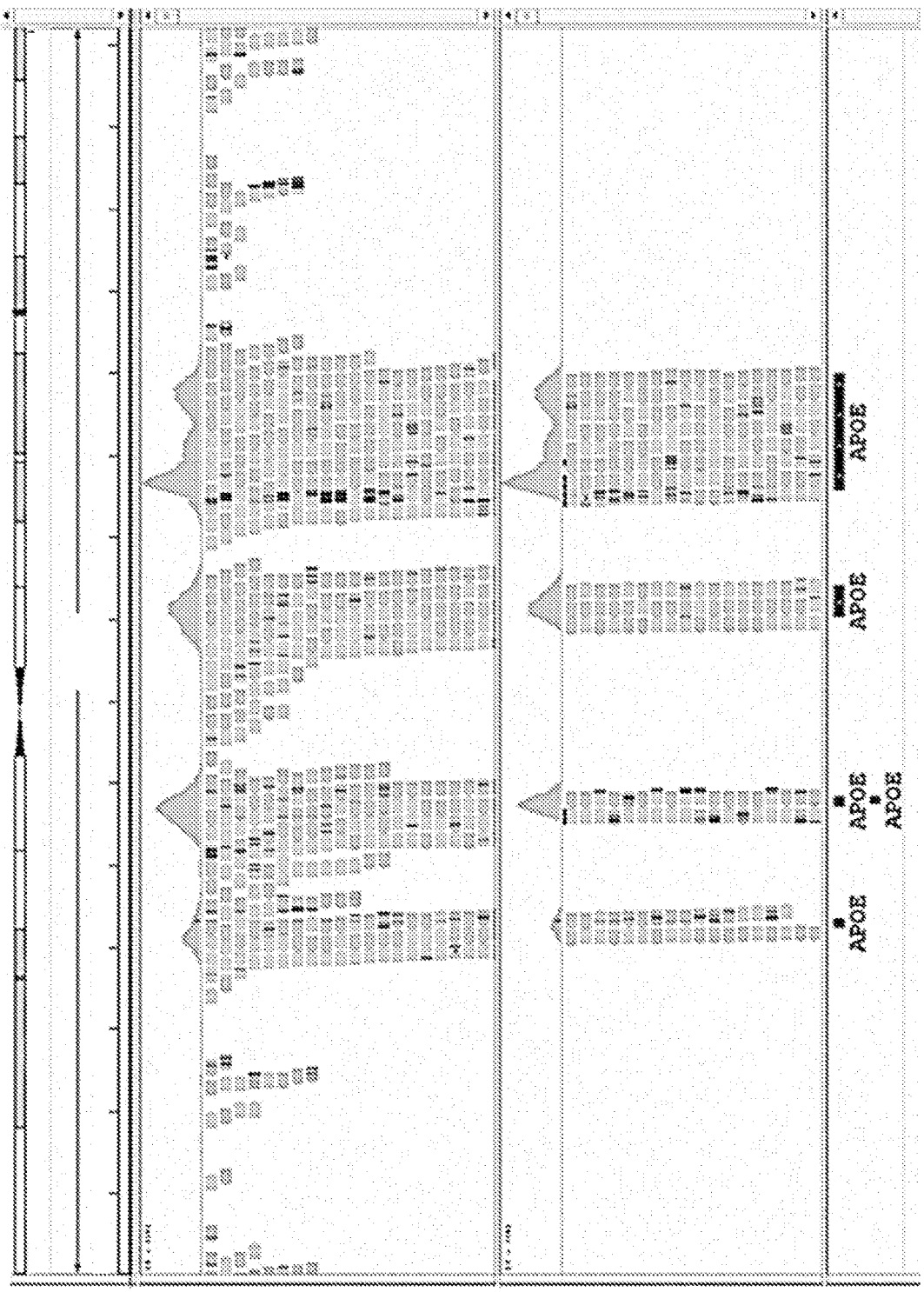
FIG. 10 shows example sequence reads from an extracted full BAM file and from the BAM file containing only the APOE exonic regions, as visualized via using the Integrated Genomic Viewer (IGV).

Extracting APOE and APOC1 genes exonic regions:
data_consumer$ privet -m view -b CPM00000001.chr19.part_enc.bam -r exon APOE,APOC1 -a CPM00000001.chr19.APOE.keystream.bin -o CPM00000001.chr19.APOE.APOC1.bam
Output
Decrypted region(s) BAM: "CPM00000001.chr19.APOE.APOC1.bam".
PrivET finished in 0 seconds.
Since Data Consumer has the keystream for the only encrypted region of the BAM, she can regenerate the full original BAM:
data_consumer$ privet -m view -b CPM00000001.chr19.part_enc.bam -a CPM00000001.chr19.APOE.keystream.bin -o CPM00000001.chr19.full.bam
PrivET finished in 8 seconds.
data_consumer$ ll
-rw-rw-r-- 1 ayutov ayutov 145320 May 15 12:39 CPM00000001.chr19.APOE.APOC1.bam
-rw-rw-r-- 1 ayutov ayutov 22976 May 15 12:39 CPM00000001.chr19.APOE.APOC1.bam.bai
-rw-rw-r-- 1 ayutov ayutov 163516 May 15 12:35 CPM00000001.chr19.APOE.keystream.bin
-rw-rw-r-- 1 ayutov ayutov 523431006 May 15 12:39 CPM00000001.chr19.full.bam
-rw-rw-r-- 1 ayutov ayutov 114096 May 15 12:39 CPM00000001.chr19.full.bam.bai
-rw-rw-r-- 1 ayutov ayutov 523431034 May 15 12:32 CPM00000001.chr19.part_enc.bam
-rw-rw-r-- 1 ayutov ayutov 114096 May 15 12:32 CPM00000001.chr19.part_enc.bam.bai
-rw-rw-r-- 1 ayutov ayutov 102711 May 15 12:38 CPM00000001.chr19.part_enc.dec.bam
-rw-rw-r-- 1 ayutov ayutov 22944 May 15 12:38 CPM00000001.chr19.part_enc.dec.bam.bai FIG. 10 shows example sequence reads from the extracted full BAM file and the BAM file containing only the APOE exonic regions, as visualized via using the Integrated Genomic Viewer (IGV). It illustrates that only the sequencing reads from the APOE exonic regions are now made accessible or available, as desired.

The disclosed algorithms and LUBA-PrivET tools provide the capability of fine-grained and privacy-preserving dynamic encryption and decryption of genomic sequencing data, as well as the ownership protection and auditing capabilities. These algorithms can be used by the data owner, data producers, data distributors, and data consumers for a full range of genomic sequencing data transactions, such that the privacy is properly preserved, ownership is protected, related laws (e.g., GINA) are followed and corresponding regulations (e.g., HIPAA) are complied with.

Aim 1. Implement flexible attribute-based access control. The system will be continuously extending with the support for flexible, fine-grained policies using the attribute-based encryption (ABE). In addition to the entity- and time-based constraints, access may be controlled based on other attributes, such as type of data requestor (e.g., family member, clinical research coordinator, collaborating organization), country or location of the requestor, minimum age of the data owner at the time of data release, etc.

Specific Aim 2. Extend the system to track the data release and processing transactions using blockchain technology. With dynamic consent, proper audit is critically important in order to maintain privacy and transparency. For this purpose, blockchain technology may be used to extend the system with consistent, secure, and decentralized audit.

Specific Aim 3. Design and implement a secure and data utility preserving novel watermarking scheme for genomic data to deter and track unauthorized use of data. A novel secure watermarking scheme is implemented for secure genomic data sharing, as described herein. The described watermarking schemes may be integrated with dynamic encryption as well as processing and tracking transactions using blockchain technology.

Once fully implemented and widely adopted, the disclosed technologies may greatly empower participant-centric decision making and facilitate large scale data sharing required for cancer genomic research. On the commercial side, large sequencing facilities or companies may use it to ensure privacy policy compliance or to provide privacy-ensuring data encryption services. Cloud vendors may use it for offering genomic data storage and management services, potentially creating a genomic data marketplace. Data consumers such as researchers will be able to quickly locate a large number of genomic data sets that meet the specified consent requirements using the described technologies.

Overarching Considerations: Informatics and Cryptographic Technologies can Address Major Challenges with Sharing Genomic Data Specific Aim 1: Implement Flexible Attribute-Based Access Control.

Figure 11:
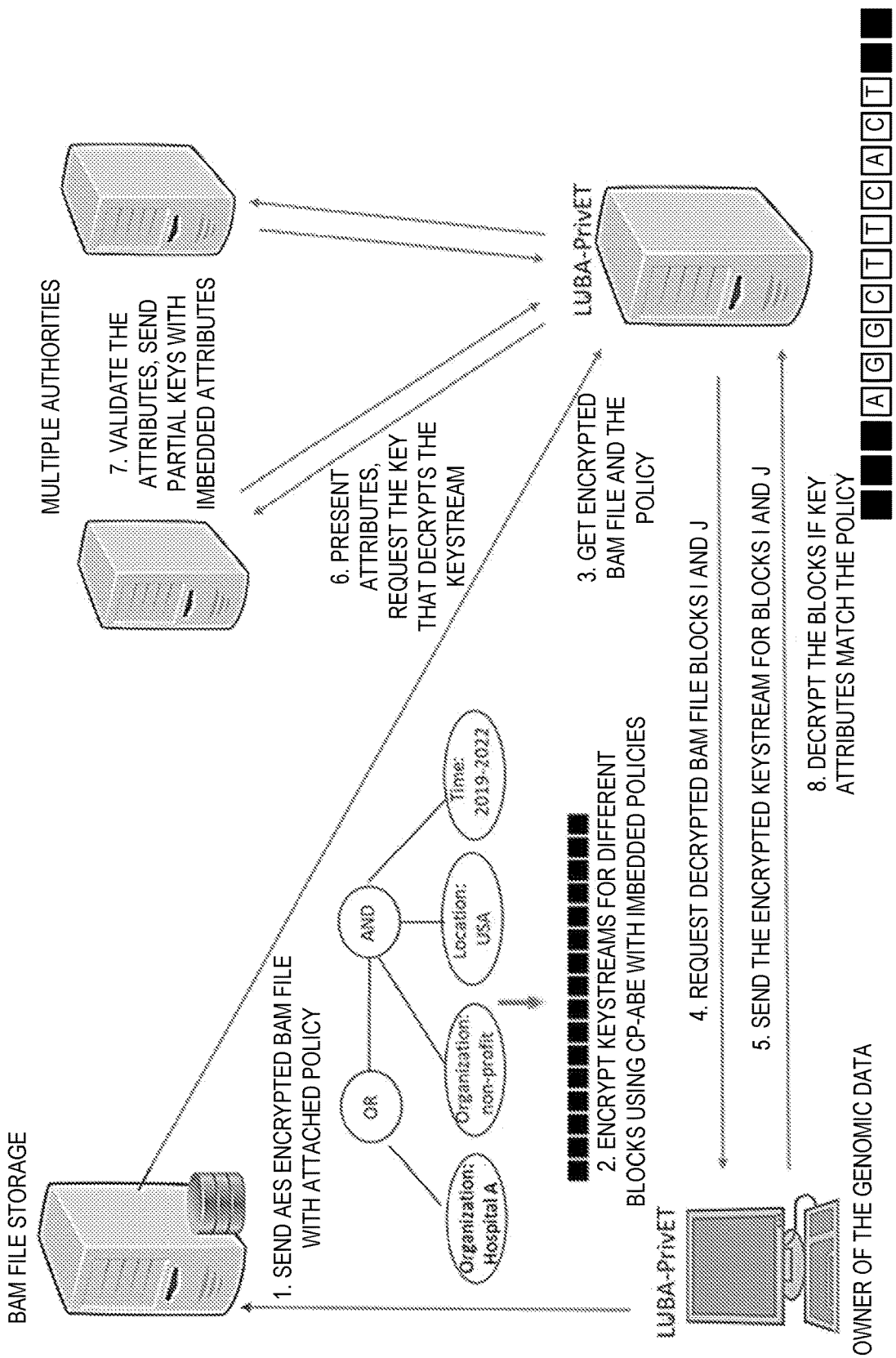
FIG. 11 schematically shows an example system for implementing attribute-based encryption (ABE) in accordance with embodiments of the present disclosure.

Rationale: The disclosure also provides for even finer-grained or more granular data access control: implementing controls over what, when, where and to what extent a participant's genomic data can be shared. Only with these refined levels of controls, can the dynamic consent be truly implemented, all three pillars of informed consent be truly enforced, or the ownership-based governance be truly enabled. To address this feature, attribute-based encryption (ABE) may be implemented. An example system for implementing ABE is shown in FIG. 11.

Experimental Design and Methods

Attribute-Based Encryption (ABE) is a next-generation type of public key encryption that supports fine-grained access control policies that are cryptographically enforced.

Data objects are encrypted using a set of attributes typically expressed as logical combinations referencing attributes of the requester, environment, or the data object. The system may therefore be extended with the support for flexible, fine-grained policies using the Ciphertext Policy (CP) ABE encryption. In CP-ABE system, attributes are associated with users and policies are bound with each ciphertext. A user can decrypt a ciphertext if and only if her attributes satisfy the policy.

Access to genomic data may be controlled based on how it will be used. For example, clinical, research and commercial use cases will be differentiated. The data owner will have a choice to release sensitive genomic information to a treatment provider, while keeping it private from other organizations.

Additionally, attributes that allow one to seek consent for more narrowly defined research uses of participant's data may be supported. For example, use of the data can be limited to:
  health/redical/biornedical purposes; does not include the study of population origins or ancestry
  a specified disease
  not-for-profit purposes or by non-commercial entities Time-based attributes may be implemented as well. A specific time period, during which the keystream can be decrypted, may be defined in the policy. This allows different time constraints to be imposed on various genomic regions. For example, certain genes can only be decrypted within a short period of time after the release of the keystream, while other genes will become available after a particular date.

In addition to the usage and time-based constraints, access may be controlled based on other attributes, such as type of the data requestor (e.g., relative, member of a particular organization), country or location of the requestor, minimum age of the data owner at the time of data release, etc.

Payment can be added to the set of attributes as well, to allow the participants to benefit from sharing their genomic data.

The ABE may be an extra layer on top of the existing implementation of the encryption schema. In particular, additional flexible controls enabled by CP-ABE protect the keystream that the owner of the genomic data can choose to share to decrypt specific genomic regions of the encrypted BAM file. A different policy can be attached to each keystream.

The attribute-based policies may be embedded in the encrypted data objects (ciphertext), thus making it impossible to remove or modify the policies. The data requestor will need to proof the possession of the requestor-related attributes, in order to decrypt the ciphertext. Other types of attributes may also be checked before enabling the object decryption.

To avoid reliance on a single trusted party to release the corresponding decryption keys, a multi-authority scheme may be adopted based on the threshold secret sharing cryptographic constructions. The key that decrypts the sensitive ciphertext can be distributed over several parties then reconstructed when needed.

For example, the key can be split into N partial keys. The partial keys may be securely distributed to N authorities. To decrypt the keystream, M out of N (M≤N) parties
collaborate to combine their parts to construct the key that will decrypt the keystream. There are cryptographic constructions that support such distributed threshold secret sharing.

OpenABE library may be used for implementation of the disclosed technologies. OpenABE is a C/C++ software library that implements several attribute-based encryption schemes. It provides an efficient implementation that embeds security guarantees at the architectural level. OpenABE incorporates best practices in encryption scheme design which includes security against chosen ciphertext attacks, a simple interface for transporting symmetric keys, and support for performing encryption of large data objects.

The LUBA-PrivET system may be implemented in a highly modular manner. The ABE module can be added or dropped.

Specific Aim 2: Extend the System with the Blockchain Technology to Track the Data Release and Processing Transactions.

Rationale: With dynamic consent, proper audit is critically important in order to maintain privacy and transparency. The current dynamic consent systems typically support data retrieval from a single portal with no multi-party validation. Such centralized environment becomes a single point of failure and an attractive target for malicious attacks. Additionally, such centralized untraceable data management prevents a high level of transparency, limiting the trust relationship between the data owner, the data repository, and data consumer. Blockchain is a distributed (spread across a network of computers) public ledger that can record and store transactions in an unalterable and verifiable way. The blockchain technology allows sensitive information to be exchanged and modified in a verifiable and traceable manner. When a related data item on the blockchain is added or altered, the appropriate parties (e.g., data owner, data storage facility) will be notified of the change and the validation of the transaction could be requested. The described systems may be extended with the blockchain technology to implement consistent decentralized audit.

Experimental Design and Methods:

For the proper audit purpose, the blockchain technology may be added to the disclosed LUBA-PrivET system to audit data release and usage processes. Events that can be recorded on the blockchain include but are not limited to 1) posting a BAM file with associated policies (time, entity who posted it, the policies, etc.); 2) release of encrypted BAM file (time, entity that released the file, entity who received the file, etc.); 3) sending of the encrypted keystream (time, entity who sent it, entity who received it, the blocks that will be decrypted using the keystreams, etc.); 4) validation of the relevant attributes (time, entity which validated the attributes, entity which presented the attributes, the values of the attributes, etc.; 5) the distribution of the partial keys that are needed to decrypt the keystream (entities that received the partial keys, timestamp, etc.); 6) release of the partial keys by collaborating entities to construct the key that decrypts the keystream (time, parties that released the partial keys, entity that received the partial keys, etc.); 7) usage of the decrypted data (entity that processed the decrypted data, time, etc.).

The described systems may be extended with the blockchain technology to track the data release and processing transactions. Hyperledger Fabric may be used for implementation in one example.

Hyperledger is an open-source permissioned blockchain initiative under IBM and the Linux Foundation. Permissioned blockchain restricts who is allowed to participate in the network, and what transactions can be created and queried.

Hyperledger Fabric is a blockchain implementation within this project. It is a modular and customizable blockchain system for developing distributed blockchain applications. It employs a customizable consensus, smart contracts (called chaincode), and transaction validation. Transactions may remain private, but participants cannot be anonymous.

The shared ledger records the state of the audit log. The ledger stores collections of transactions as blocks. In addition to transaction records, each block contains a timestamp of when that block was created as well as the cryptographic hash of the data contained in the previous block.

The timestamped hash-chaining functionality of the blockchain ledger, combined with data replication on nodes across the network, ensure that attackers cannot modify audit log data once it has been committed to the ledger. Cryptographic identities maintained on the permissioned blockchain network link each transaction to the user who owns that cryptographic identity, maintaining user accountability.

The main Fabric components:
Membership Service Provider (or Certificate Authority) —provides cryptographic identity management: issues and validates digital certificates, authenticates users. It handles new user registration and enrollment, allowing new end users to register on the network at each participant organization.
Orderer (or ordering service) provides a shared communication channel to client applications and peers, offering a broadcast service for messages containing transactions. The communicated messages are the candidate transactions for inclusion in the ledger state.

Peer receives ordered ledger state updates in the form of blocks from the orderer and maintains the state of the ledger. Peers store the full ledger. Peers can store some data in a private database (e.g., audit records which contain sensitive information), which can be accessed from chaincode on these authorized peers. The ordering service does not see the private data. A hash of that data is endorsed, ordered, and written to the ledgers of every peer. The hash serves as an evidence of the transaction and is used for state validation and can be used for audit purposes.

Peers can additionally take up a role of an endorser. Endorsement protocol in Fabric species the number and type of peers that need to provide signatures on a transaction to be validated later in the process.

Organization logically separates members (peers) from each other, and may or may not share the Certificate Authority.

Each participant organization owns a peer node and a Certificate Authority. All nodes share an ordering service. Each peer node holds a full copy of the ledger containing the audit log data.

The disclosure further includes customizing the following Fabric components:

Transactions which will consist of audit log data.

Queries which will consist of parameters specifying the properties of audit log data being requested by the end user.
  Users can query the audit ledger to monitor usage of their genomic data.
  Audit companies can query the leger to monitor usage of a set of users.

Chaincode which will implement audit- and access control-related logic.

Figure 12:
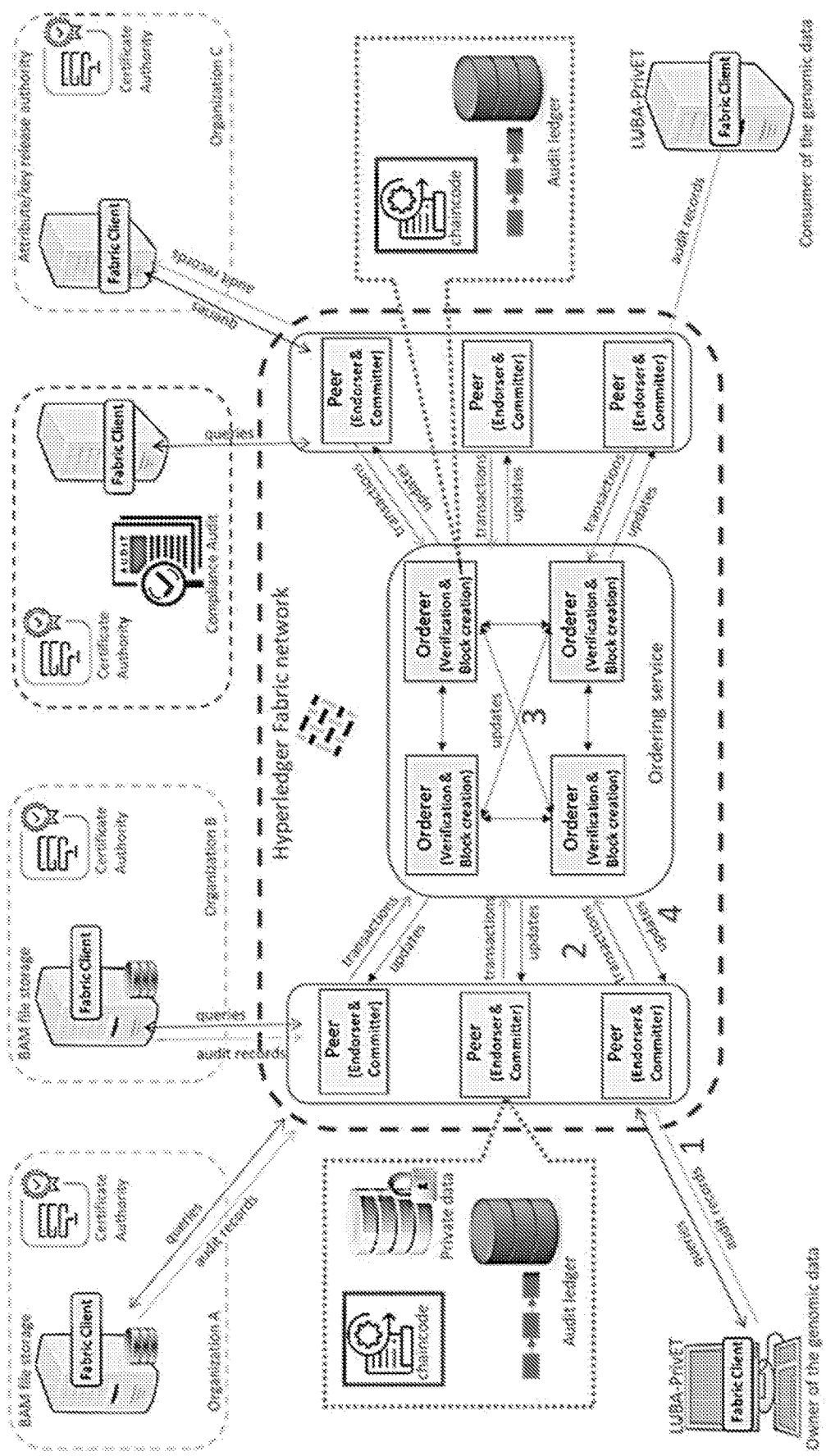
FIG. 12 schematically shows an example deployment model for embodiments of the present disclosure.

FIG. 12 outlines an example of the disclosed deployment model, some arrows and components are omitted for simplicity.

The audit ledger update process involves four steps:
1. The Fabric client (Client SDK for Node.js.) connects to a Hyperledger Fabric network, creates an audit transaction and sends it to the endorsing peer.
2. The endorsing peer verifies the client's signature. If the check succeeds, the transaction is endorsed and submitted to the ordering service, which manages the block creation. Otherwise, the transaction is cancelled.
3. The ordering service ensures that the signatures of endorsing peers are valid, creates a new block and broadcasts it to all peers on the network.
4. All ordering peers validate the new block. They check the endorsement policy to ensure that the correct allotment of the specified peers have signed the results, and they authenticate the signatures against the transaction payload. All peers commit and apply the same sequence of transactions and update their state.

A custom chaincode may be developed using Go (the general-purpose programming language supported by Fabric) to manage audit log creation, query, and detection of unauthorized access. The custom chaincode may be deployed on the Fabric network.

Chaincode handling the creation and retrieval of audit log data (deployed on endorsing peers) may impose a standard structure, achieving interoperability for participating provider organizations.

Audit data generated by various applications may be stored on a single blockchain, simplifying and streamlining audit log reporting and analysis.

Automated analysis of audit logs (deployed on ordering and endorsement peers) may allow automatic timely detection of malicious behavior in the system. Examples of events that can be detected:
  a decrypted BAM file was processed after the expiration date
  a decrypted BAM file was processed, but there is no audit record about keystream release by the data owner or partial key release by the attribute validation authorities
  a BAM file was sent to a client, but there is no audit record of data owner sending the file to the storage facility Peers run custom audit log chaincode that formats audit log data, returns audit log data to clients in response to queries, adds new audit log entries to the ledger, and detects suspicious and unauthorized activity.

Specific Aim 3: Design and Implement a Secure and Data Utility Preserving Novel Watermarking Scheme for Genomic Data to Deter and Track Unauthorized Use of Data.

Rationale: One may not be able to trust the data consumers to comply with the access control policies after the data is released. In particular, after the data is decrypted, it can be stored and used again after the expiration date/time. The data can also be distributed to unauthorized parties. To address this problem, a novel secure watermarking scheme for genomic data sharing may be implemented in accordance with the present disclosure. The challenge is to develop a scheme that:
  (1) is resilient to watermark detection and modification: the data consumer should not be able to determine, change or remove the watermarked data items;
  (2) minimizes data loss due to embedded watermark and preserves the utility of the data.

The watermark may uniquely identify a particular data file. An audit record about every use of the decrypted data may be posted on the blockchain. Since the watermark cannot be removed from the data, the system may be able to automatically track and validate the transactions. For example, the system can compare the identities of the entities that were authorized to access a particular watermarked data, as well as check the time-based data use constrains. The system may alert the corresponding parties, if it finds inconsistencies.

Experimental Design and Methods:

A watermark may be embedded in a BAM file or a VCF file that allows for the tracking of incidents of sharing or re-using of the file in violation of the policy.

The watermark added to a BAM or a VCF file may be configured so as to not affect the subsequent analysis. One approach is to modify the low quality data. A watermark pattern can be inserted into low quality BAM reads, which may be filtered out, for example, by a variant caller. Rather than attaching the watermark to specific data points (genomic positions), the pattern may be bound to positions within a read. To make watermark difficult to detect and modify, it can be inserted at different offsets from the beginning of the reads. This can be achieved by utilizing a keyed hash function to map read names to an array of the typical read length (e.g., 100 bp). The hashed value will then be the starting position of the watermark. To test the utility of the watermarked data, it may be processed with the bcbio bioinformatics pipeline, which detects germline or somatic variants from NGS data using multiple most popular variant callers, and validate the results with the non-watermarked data.

Shared genomic data can be fully or partially encrypted by LUBA-PrivET. Prior to using the encrypted data, the data consumer may run LUBA-PrivET to decrypt the data using the key stream provided by the data owner, as well as to extract the unencrypted portion of the data. While other bioinformatics tools (SAMTools, BCFTools) may be able to extract some unencrypted data, they will report errors when approaching the encrypted regions.

Unencrypted original genomic data may be watermarked before sharing. If the data is sent to multiple data storages, a different watermark may be assigned in each data file. Thereby, the shared encrypted or partially decrypted data can be always traced to the responsible organization.

The record of the watermarking procedure may be stored on the blockchain. Every time the owner of the data releases a keystream to decrypt a portion of the data, the record of this event is stored on the blockchain as well. By monitoring the blockchain transactions, the system can automatically detect potential violations of corresponding policies (e.g., key stream is used past the expiration date, the key stream is shared with another organization, etc.).

To summarize, by watermarking the genomic data, each organization that stores the data can be held accountable for sharing the data and for violating the data access control policies. Together, the disclosure describes the development of a comprehensive informatics systems and tools to address existing technical, legal and ethical hurdles associated with sharing genomic data effectively, securely, and transparently.

| Timeline | |
| --- | --- |
| Year 1 | Aim 1: Implement ABE-based access control |
| | Aim 2: Extend the system with blockchain technology to track the transactions. |
| Year 2 | Aim 2: Extend the system with blockchain technology to track the transactions. |
| | Aim 3: Design and implement a secure and data utility preserving watermarking scheme for genomic data. |

Impact: In this application, an innovative suite of informatics tools and algorithms that will greatly facilitate sharing genomic data are implemented, with a plethora of desirable features and features combinations. Once fully implemented, the disclosed systems and methods may greatly and positively impact sharing genomic data in the community.

Once fully implemented, the described systems and methods may greatly empower participant-centric decision making and facilitate large scale data sharing used for cancer genomic research. On the commercial side, large sequencing facilities or companies may use it to ensure privacy compliance or to provide privacy-ensuring data encryption services. Cloud vendors like AWS and Google may use it for offering genomic data storage and management services, potentially creating a genomic data marketplace. Data consumers such as researchers will be able to use the disclosed systems and methods to quickly locate a large number of genomic data sets that meet the specified consent requirements.

Example Embodiments

A first example embodiments includes a method of dynamically applying a watermark to at least a portion of a file, the method comprising generating, using information derived from a secret key, a first random seed, generating, using the first random seed, an ordered pseudorandom set of integers, generating, using dynamic attribute information, a second random seed, selecting, using the second random seed, a subset of the ordered pseudorandom set of integers, the subset corresponding to identifiers of data locations in the file, and modifying data at data locations in the file corresponding to at least a portion of the identifiers included in the subset to generate a watermarked file.

A second example embodiment includes the first example embodiment, and further includes the method, wherein the dynamic attribute information includes entity information for an entity to which the file is being distributed, timing information corresponding to a validity time period for the file, a data usage policy for the file, and/or one or more other attributes of a policy for the data.

A third example embodiment includes the first and/or second example embodiment, and further includes the method, wherein modifying the data comprises generating, using the first random seed, a pseudorandom integer and changing the data to a value that is based on the pseudorandom integer.

A fourth example embodiment includes one or more of the first through third example embodiments, and further comprises determining which of the data locations corresponding to the identifiers of the subset meet selected criteria, and wherein the portion of the identifiers correspond to the identifiers of the subset that meet the selected criteria.

A fifth example embodiment includes one or more of the first through fourth example embodiments, and further comprises assigning a selected quality score to modified data, the selected quality score being selected based on quality scores of data at each other data location in the file.

A sixth example embodiment includes one or more of the first through fifth example embodiments, and further includes the method, wherein the selected quality score corresponds to a quality score below a threshold that is most frequently assigned to the data at each other data location in the file relative to other quality scores below the threshold.

A seventh example embodiment includes one or more of the first through sixth example embodiments, and further includes the method, wherein the first random seed and/or the second random seed is generated with a secure hash algorithm.

An eighth example embodiment includes one or more of the first through seventh example embodiments, and further includes the method, wherein an entity to which the file is being distributed is a first entity, and wherein the subset of the ordered pseudorandom set of integers is selected to only partially overlap with another subset or subsets of ordered pseudorandom sets of integers that is generated for watermarking the file for distribution to another, different entity or entities.

A ninth example embodiment includes one or more of the first through eighth example embodiments, and further includes the method, wherein the file comprises a genomic data file that includes a sequencing data set.

A tenth example embodiment includes one or more of the first through ninth example embodiments, and further includes the method, wherein the genomic data file is a Binary Alignment Map (BAM) file.

An eleventh example embodiment includes one or more of the first through tenth example embodiments, and further includes the method, wherein the data locations in the file comprise reference bases in the sequencing data set, and wherein modifying the data comprises switching the reference bases in the data locations in the file corresponding to at least the portion of the identifiers included in the subset from the respective reference base to a selected alternative base.

A twelfth example embodiment includes one or more of the first through eleventh example embodiments, and further includes the method, wherein the selected alternative base is selected based on a randomly generated number that is generated using the first random seed.

A thirteenth example embodiment includes one or more of the first through twelfth example embodiments, and further comprises determining which of the data locations corresponding to the identifiers of the subset meet selected criteria, wherein the portion of the identifiers correspond to the identifiers of the subset that meet the selected criteria, and wherein the selected criteria includes data locations that have a number of sequencing reads with the selected alternative base that is less than a threshold.

A fourteenth example embodiment includes one or more of the first through thirteenth example embodiments, and further includes the method, wherein the watermarked file is a reference watermarked file, the method further comprising validating a targeted file by determining whether the watermark is present in the targeted file by generating a sequence of watermark elements based on information derived from the secret key and comparing the percentage of watermark elements discovered in the targeted file to the expected percentage of watermark elements that can be discovered by chance, estimated by a Monte Carlo simulation with random seeds.

A fifteenth example embodiment includes one or more of the first through fourteenth example embodiments, and further comprises detecting collusion between two or more entities to attempt to modify or remove a watermark from the file by determining which watermark elements in the sequence of watermark elements generated during generation of the reference watermarked file are missing in the targeted file and which watermark elements in the sequence of watermark elements generated during generation of the reference watermarked file are present in the targeted file.

A sixteenth example embodiment includes one or more of the first through fifteenth example embodiments, and further comprises transmitting the watermarked file to an entity associated with the dynamic attribute information.

A seventeenth example embodiment includes one or more of the first through sixteenth example embodiments, and further comprises dynamically encrypting the watermarked file.

An eighteenth example embodiment includes one or more of the first through seventeenth example embodiments, and further comprises the method, wherein the secret key is a watermarking secret key and the watermarked filed is formed of multiple blocks of ordered data to enable partial decryption of the watermarked file, and wherein dynamically encrypting the watermarked file comprises generating, using an encryption secret key and one or more initialization vectors associated with the watermarked file, a keystream for the multiple blocks of ordered data of the watermarked file, encrypting the multiple blocks of ordered data of the watermarked file by performing a logical operation of the keystream with the multiple blocks of ordered data in a one-to-one correspondence, and building a file index of the watermarked file to identify location information of the multiple blocks of ordered data.

A nineteenth example embodiment includes one or more of the first through eighteenth example embodiments, and further includes the method, wherein the keystream is formed of a plurality of blocks, each block of the keystream corresponding to an associated block of the watermarked file.

A twentieth example embodiment includes one or more of the first through nineteenth example embodiments, and further includes the method, wherein each block of the keystream has a value that is a function of the encryption secret key, the initialization vectors, and an offset of the respective associated block of the file from a beginning of the file, and wherein each block of the keystream has a length that is equal to a length of the respective associated block of the file, wherein the initialization vectors include a value that is combined with the encryption secret key to generate the keystream.

A twenty-first example embodiment includes one or more of the first through twentieth example embodiments, and further includes the method, wherein building the index of the file comprises, for each block of the watermarked file: reading the block from the watermarked file, wherein the ordered data of the block includes one or more data groupings, identifying start and end positions for each data grouping of the block and saving the start and end positions with an associated read offset from a start of the block, updating a block encryption index for the block, the block encryption index identifying the start and end positions of the data groupings for the block, and updating the file index for the watermarked file using the saved start and end positions and the associated read offsets identified in the block encryption index, the file index storing the information from the block encryption index for each block of the watermarked file.

A twenty-second example embodiment includes one or more of the first through twenty-first example embodiments, and further includes the method, wherein the data groupings include sorted genomic sequencing data.

A twenty-third example embodiment includes one or more of the first through twenty-second example embodiments, and further includes the method, wherein the sorted genomic sequencing data is sorted by chromosome position.

A twenty-fourth example embodiment includes one or more of the first through twenty-third example embodiments, and further includes the method, wherein each of the associated read offsets comprises a respective number of bits or a respective number of bytes indicating a distance from a beginning of the file.

A twenty-fifth example embodiment includes one or more of the first through twenty-fourth example embodiments, and further includes the method, wherein the encryption secret key and/or the keystream is generated using a stream cipher or a block cipher in a counter mode of operation.

A twenty-sixth example embodiment includes one or more of the first through twenty-fifth example embodiments, and further includes the method, wherein the stream cipher includes Salsa 20 and wherein the block cipher in the counter mode of operation includes Advanced Encryption Standard, Counter mode (AES-CTR).

A twenty-seventh example embodiment includes one or more of the first through twenty-sixth example embodiments, and further includes the method, wherein the watermarked file is an ordered genomic sequencing data file.

A twenty-eighth example embodiment includes one or more of the first through twenty-seventh example embodiments, and further includes the method, wherein the ordered genomic data file is in a Blocked GNU Zip Format (BGZF).

A twenty-ninth example embodiment includes one or more of the first through twenty-eighth example embodiments, and further includes the method, wherein the ordered genomic data file is a Binary Alignment Map (BAM) file storing genomic sequences or a Variant Call Format (VCF) file storing genomic variation.

A thirtieth example embodiment includes one or more of the first through twenty-ninth example embodiments, and further includes the method, wherein the logical operation includes an XOR or an XNOR operation.

A thirty-first example embodiment includes one or more of the first through thirtieth example embodiments, and further includes the method, wherein the encryption secret key is a random number that is not shared during decryption of the file.

A thirty-second example embodiment includes one or more of the first through thirty-first example embodiments, and further includes the method, wherein dynamically encrypting the watermarked file includes encrypting only a portion of the watermarked file, encrypting different portions of the watermarked file at different times, encrypting only a portion of a block of the watermarked file, and/or re-encrypting at least a portion of the watermarked file after performing a prior encryption of the watermarked file.

A thirty-third example embodiment includes one or more of the first through thirty-second example embodiments, and further comprises embedding policy information in the encrypted blocks of data, the policy information defining, for each data grouping of each block of the watermarked file, rules for decrypting the data grouping.

A thirty-fourth example embodiment includes one or more of the first through thirty-third example embodiments, and further comprises the method, wherein the rules include time-based rules that define a time or time duration in which the data grouping is allowed to be decrypted, requesting party rules that define entities and/or users that are allowed to decrypt the data grouping, and/or usage rules that define one or more usages for which the data grouping is allowed to be decrypted.

A thirty-fifth example embodiment includes one or more of the first through thirty-fourth example embodiments, and further comprises revising one or more of the rules for decrypting the data grouping responsive to receiving an associated request from an owner of the ordered data stored in the watermarked file.

A thirty-sixth example embodiment includes one or more of the first through thirty-fifth example embodiments, and further includes the method, wherein revising one or more of the rules includes rescinding access to one or more portions of the keystream and/or rescinding, after at least a portion of the watermarked file is decrypted, access to decrypted data of the watermarked file.

A thirty-seventh example embodiment includes one or more of the first through thirty-sixth example embodiments, and further includes the method, wherein encrypting the multiple blocks of ordered data generates multiple blocks of encrypted data corresponding to the watermarked file, the method further comprising dynamically decrypting at least a portion of the watermarked file.

A thirty-eighth example embodiment includes one or more of the first through thirty-seventh example embodiments, and further includes the method, wherein dynamically decrypting at least the portion of the watermarked file includes decrypting at least one selected block of encrypted data of the watermarked file using a portion of the keystream, the portion of the keystream corresponding to the at least one selected block.

A thirty-ninth example embodiment includes one or more of the first through thirty-eighth example embodiments, and further includes the method, wherein the at least one selected block of encrypted data comprises only a subset of the multiple blocks of encrypted data of the watermarked file.

A fortieth example embodiment includes one or more of the first through thirty-ninth example embodiments, and further includes the method, wherein decrypting the at least one selected block includes performing a logical operation of the portion of the keystream with the encrypted data of the at least one selected block to generate plaintext data corresponding only to the at least one selected block.

A forty-first example embodiment includes a method of detecting and/or verifying a watermark in a file, the method comprising generating, using information derived from a secret key associated with the watermark, a first random seed, generating, using the first random seed, an ordered pseudorandom set of integers, generating, using entity information for at least one entity to which the file was distributed and timing information corresponding to a validity time period for the file, a second random seed, selecting, using the second random seed, a subset of the ordered pseudorandom set of integers, the subset corresponding to identifiers of data locations in the file, generating a sequence of watermark elements, the watermark elements comprising expected values for associated locations in the file, the associated locations being selected based on the first random seed and the expected values being selected based on the second random seed, and comparing the sequence of watermark elements to the file to determine whether the associated locations in the file are populated with the respective associated expected values.

A forty-second example embodiment includes the forty-first example embodiment, and further includes the method, wherein the file is an encrypted file formed of multiple blocks of encrypted data, the method further comprising dynamically decrypting at least a portion of the file to generate a decrypted file, and wherein comparing the sequence of watermark elements to the file comprises comparing the sequence of watermark elements to the decrypted file.

A forty-third example embodiment includes the forty-first example embodiment and/or the forty-second example embodiment, and further includes the method, wherein dynamically decrypting at least a portion of the file comprises receiving a request to decrypt at least one selected block of encrypted data of the file, responsive to validating the request, retrieving a portion of a keystream for the file, the portion of the keystream corresponding to the at least one selected block, and decrypting the at least one selected block by performing a logical operation of the portion of the keystream with the encrypted data of the at least one selected block to generate plaintext data corresponding only to the at least one selected block.

A forty-fourth example embodiment includes one or more of the forty-first through forty-third example embodiments, and further comprises validating the request by comparing attributes of the request and a user making the request with one or more attributes associated with the user and/or policies bound with the encrypted data to determine if the user and the request are in compliance with the attributes and policies, respectively.

A forty-fifth example embodiment includes one or more of the forty-first through forty-fourth example embodiments, and further includes the method, wherein dynamically decrypting the file comprises decrypting selected portions of the file using the keystream while remaining portions of the file are not decryptable.

A forty-sixth example embodiment includes one or more of the forty-first through forty-fifth example embodiments, and further includes the method, wherein selected portions of the file are decryptable using the portion of the keystream while remaining portions of the file are not decryptable.

A forty-seventh example embodiment includes one or more of the forty-first through forty-sixth example embodiments, and further includes the method, wherein the encrypted data of the file is generated using an encryption secret key, the encryption secret key being used to generate the keystream, different portions of which are subsequently used for decrypting only respective portions of the file in respective decryption iterations without sharing the encryption secret key.

A forty-eighth example embodiment includes a system for detecting and/or verifying a watermark in a file, the system comprising a processor, and memory storing instructions executable by the processor to generate, using information derived from a secret key associated with the watermark, a first random seed, generate, using the first random seed, an ordered pseudorandom set of integers, generate, using entity information for at least one entity to which the file was distributed and timing information corresponding to a validity time period for the file, a second random seed, select, using the second random seed, a subset of the ordered pseudorandom set of integers, the subset corresponding to identifiers of data locations in the file, generate a sequence of watermark elements, the watermark elements comprising expected values for associated locations in the file, the associated locations being selected based on the first random seed and the expected values being selected based on the second random seed, and compare the sequence of watermark elements to the file to determine whether the associated locations in the file are populated with the respective associated expected values.

A forty-ninth example embodiment includes the forty-eighth example embodiment, and further includes the system, wherein the file is an encrypted file formed of multiple blocks of encrypted data, the method further comprising dynamically decrypting at least a portion of the file to generate a decrypted file, and wherein comparing the sequence of watermark elements to the file comprises comparing the sequence of watermark elements to the decrypted file.

A fiftieth example embodiment includes the forty-eighth and/or the forty-ninth example embodiment, and further includes the system, wherein dynamically decrypting at least a portion of the file comprises receiving a request to decrypt at least one selected block of encrypted data of the file, responsive to validating the request, retrieving a portion of a keystream for the file, the portion of the keystream corresponding to the at least one selected block, and decrypting the at least one selected block by performing a logical operation of the portion of the keystream with the encrypted data of the at least one selected block to generate plaintext data corresponding only to the at least one selected block.

A fifty-first example embodiment includes one or more of the forty-eighth through fiftieth example embodiments, and further includes the system, wherein dynamically decrypting the file comprises decrypting selected portions of the file using the keystream while remaining portions of the file are not decryptable.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

---

---

We claim:

1. A method of dynamically applying a watermark to at least a portion of a file, the method comprising:
   generating, using information derived from a secret key, a first random seed;
   generating, using the first random seed, an ordered pseudorandom set of integers;
   generating, using dynamic attribute information, a second random seed;
   selecting, using the second random seed, a subset of the ordered pseudorandom set of integers, the subset corresponding to identifiers of data locations in the file; and
   modifying data at data locations in the file corresponding to at least a portion of the identifiers included in the subset to generate a watermarked file.

2. The method of claim 1, wherein the dynamic attribute information includes entity information for an entity to which the file is being distributed, timing information corresponding to a validity time period for the file, a data usage policy for the file, and/or one or more other attributes of a policy for the data.

3. The method of claim 1, wherein modifying the data comprises generating, using the first random seed, a pseudorandom integer and changing the data to a value that is based on the pseudorandom integer.

4. The method of claim 1, further comprising determining which of the data locations corresponding to the identifiers of the subset meet selected criteria, and wherein the portion of the identifiers correspond to the identifiers of the subset that meet the selected criteria.

5. The method of claim 1, further comprising assigning a selected quality score to modified data, the selected quality score being selected based on quality scores of data at each other data location in the file, wherein the selected quality score corresponds to a quality score below a threshold that is most frequently assigned to the data at each other data location in the file relative to other quality scores below the threshold.

6. The method of claim 1, wherein an entity to which the file is being distributed is a first entity, and wherein the subset of the ordered pseudorandom set of integers is selected to only partially overlap with another subset or subsets of ordered pseudorandom sets of integers that is generated for watermarking the file for distribution to another, different entity or entities.

7. The method of claim 1, wherein the file comprises a genomic data file that includes a sequencing data set, wherein the data locations in the file comprise reference bases in the sequencing data set, and wherein modifying the data comprises switching the reference bases in the data locations in the file corresponding to at least the portion of the identifiers included in the subset from the respective reference base to a selected alternative base.

8. The method of claim 7, wherein the selected alternative base is selected based on a randomly generated number that is generated using the first random seed.

9. The method of claim 7, further comprising determining which of the data locations corresponding to the identifiers of the subset meet selected criteria, wherein the portion of the identifiers correspond to the identifiers of the subset that meet the selected criteria, and wherein the selected criteria includes data locations that have a number of sequencing reads with the selected alternative base that is less than a threshold.

10. The method of claim 1, wherein the watermarked file is a reference watermarked file, the method further comprising validating a targeted file by determining whether the watermark is present in the targeted file by generating a sequence of watermark elements based on information derived from the secret key and comparing the percentage of watermark elements discovered in the targeted file to the expected percentage of watermark elements that can be discovered by chance, estimated by a Monte Carlo simulation with random seeds.

11. The method of claim 10, further comprising detecting collusion between two or more entities to attempt to modify or remove a watermark from the file by determining which watermark elements in the sequence of watermark elements generated during generation of the reference watermarked file are missing in the targeted file and which watermark elements in the sequence of watermark elements generated during generation of the reference watermarked file are present in the targeted file.

12. The method of claim 1, further comprising dynamically encrypting the watermarked file, wherein the secret key is a watermarking secret key and the watermarked filed is formed of multiple blocks of ordered data to enable partial decryption of the watermarked file, and wherein dynamically encrypting the watermarked file comprises:
generating, using an encryption secret key and one or more initialization vectors associated with the watermarked file, a keystream for the multiple blocks of ordered data of the watermarked file;
encrypting the multiple blocks of ordered data of the watermarked file by performing a logical operation of the keystream with the multiple blocks of ordered data in a one-to-one correspondence; and
building a file index of the watermarked file to identify location information of the multiple blocks of ordered data.

13. A system for detecting and/or verifying a watermark in a file, the system comprising:
a processor; and
memory storing instructions executable by the processor to:
generate, using information derived from a secret key associated with the watermark, a first random seed;
generate, using the first random seed, an ordered pseudorandom set of integers;
generate, using entity information for at least one entity to which the file was distributed and timing information corresponding to a validity time period for the file, a second random seed;
select, using the second random seed, a subset of the ordered pseudorandom set of integers, the subset corresponding to identifiers of data locations in the file;
generate a sequence of watermark elements, the watermark elements comprising expected values for associated locations in the file, the associated locations being selected based on the first random seed and the expected values being selected based on the second random seed; and
compare the sequence of watermark elements to the file to determine whether the associated locations in the file are populated with the respective associated expected values.

14. The system of claim 13, wherein the file is an encrypted file formed of multiple blocks of encrypted data, the method further comprising dynamically decrypting at least a portion of the file to generate a decrypted file, and wherein comparing the sequence of watermark elements to the file comprises comparing the sequence of watermark elements to the decrypted file.

15. The system of claim 14, wherein dynamically decrypting at least a portion of the file comprises:
receiving a request to decrypt at least one selected block of encrypted data of the file,
responsive to validating the request, retrieving a portion of a keystream for the file, the portion of the keystream corresponding to the at least one selected block, and
decrypting the at least one selected block by performing a logical operation of the portion of the keystream with the encrypted data of the at least one selected block to generate plaintext data corresponding only to the at least one selected block.

16. The system of claim 15, wherein validating the request comprises comparing attributes of the request and a user making the request with one or more attributes associated with the user and/or policies bound with the encrypted data to determine if the user and the request are in compliance with the attributes and policies, respectively.

17. The system of claim 15, wherein dynamically decrypting the file comprises decrypting selected portions of the file using the keystream while remaining portions of the file are not decryptable.

18. The system of claim 15, wherein selected portions of the file are decryptable using the portion of the keystream while remaining portions of the file are not decryptable.

19. The system of claim 15, wherein the encrypted data of the file is generated using an encryption secret key, the encryption secret key being used to generate the keystream, different portions of which are subsequently used for decrypting only respective portions of the file in respective decryption iterations without sharing the encryption secret key.

20. The system of claim 15, wherein the at least one selected block of encrypted data comprises only a subset of the multiple blocks of encrypted data of the watermarked file.

* * * * *